United States Patent

Igarashi et al.

(10) Patent No.: US 9,963,042 B2
(45) Date of Patent: May 8, 2018

(54) APPARATUS, CHARGING CONTROL APPARATUS, AND INFORMATION INPUT/OUTPUT APPARATUS

(71) Applicant: MITSUBISHI ELECTRIC CORPORATION, Chiyoda-ku (JP)

(72) Inventors: Yuji Igarashi, Tokyo (JP); Yukio Goto, Tokyo (JP); Takanori Matsunaga, Tokyo (JP); Kazushi Shirasawa, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 32 days.

(21) Appl. No.: 14/780,980

(22) PCT Filed: Feb. 14, 2014

(86) PCT No.: PCT/JP2014/000748
§ 371 (c)(1),
(2) Date: Sep. 28, 2015

(87) PCT Pub. No.: WO2014/162648
PCT Pub. Date: Oct. 9, 2014

(65) Prior Publication Data
US 2016/0039301 A1    Feb. 11, 2016

(30) Foreign Application Priority Data

Apr. 1, 2013    (JP) .................. 2013-076224

(51) Int. Cl.
*H02J 7/00*    (2006.01)
*B60L 11/18*    (2006.01)
(Continued)

(52) U.S. Cl.
CPC ......... *B60L 11/1838* (2013.01); *B60L 11/184* (2013.01); *B60L 11/1816* (2013.01);
(Continued)

(58) Field of Classification Search
CPC .................................................. B60L 11/1838
(Continued)

(56) References Cited

U.S. PATENT DOCUMENTS 8,324,859 B2    12/2012  Rossi
8,504,227 B2    8/2013   Ichishi
(Continued)

FOREIGN PATENT DOCUMENTS

CN    102163853 A    8/2011
JP      4333798 B2    9/2009
(Continued)

OTHER PUBLICATIONS

International Preliminary Report on Patentability dated Oct. 6, 2015 in PCT/JP2014/000748 filed Feb. 14, 2014.
(Continued)

*Primary Examiner* — Edward Tso
*Assistant Examiner* — Ahmed Omar
(74) *Attorney, Agent, or Firm* — Oblon, McClelland, Maier & Neustadt, L.L.P.

(57) ABSTRACT

A method, for use in a charging system including a vehicle in which a battery is installed, a charging facility, and an information terminal, for changing a charging schedule of the battery after creating the charging schedule without re-inserting a charging cable includes: receiving a request for a change of the charging schedule; acquiring, from the charging facility, a charging parameter applied in a case where the charging schedule is changed in response to the request for the change of the charging schedule as received; and creating a charging schedule after the change using the charging parameter acquired from the charging facility.

10 Claims, 19 Drawing Sheets

(51) Int. Cl.
*H02J 7/02* (2016.01)
*H02J 7/04* (2006.01)
*H01M 10/44* (2006.01)

(52) U.S. Cl.
CPC ....... *B60L 11/1825* (2013.01); *B60L 11/1846* (2013.01); *B60L 11/1861* (2013.01); *H02J 7/02* (2013.01); *H02J 7/041* (2013.01); *B60L 2230/40* (2013.01); *B60L 2240/70* (2013.01); *B60L 2240/80* (2013.01); *B60L 2250/14* (2013.01); *B60L 2250/20* (2013.01); *H01M 10/44* (2013.01); *H02J 7/0004* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
USPC .......................................................... 320/109
See application file for complete search history.

(56) References Cited

U.S. PATENT DOCUMENTS

| | | | |
|---|---|---|---|
| 8,686,687 | B2 | 4/2014 | Rossi |
| 8,798,830 | B2 | 8/2014 | Sobue et al. |
| 2011/0202221 | A1 | 8/2011 | Sobue et al. |
| 2013/0181672 | A1* | 7/2013 | Egoshi .................. G06Q 10/02 320/109 |
| 2014/0191722 | A1* | 7/2014 | Usuki .................... H01M 10/44 320/109 |

FOREIGN PATENT DOCUMENTS

| | | |
|---|---|---|
| JP | 2010-268585 A | 11/2010 |
| JP | 2011-155824 A | 8/2011 |
| JP | 2011-188731 A | 9/2011 |
| JP | 2013-027190 A | 2/2013 |
| JP | 2013-519354 A | 5/2013 |
| WO | 2011/097142 A2 | 8/2011 |
| WO | 2013/042363 A1 | 3/2013 |

OTHER PUBLICATIONS

Written Opinion dated Mar. 11, 2014 in PCT/JP2014/000748 filed Feb. 14, 2014 (with English translation).
Combined Office Action and Search Report dated Feb. 4, 2017 in Chinese Patent Application No. 201480019919.3 (with English translation).
Office Action dated Oct. 9, 2017 in Chinese Patent Application No. 201480019919.3 (with English language translation).
International Search Report dated Mar. 11, 2014 for PCT/JP2014/000748 filed on Feb. 14, 2014.

* cited by examiner

F I G . 1 7
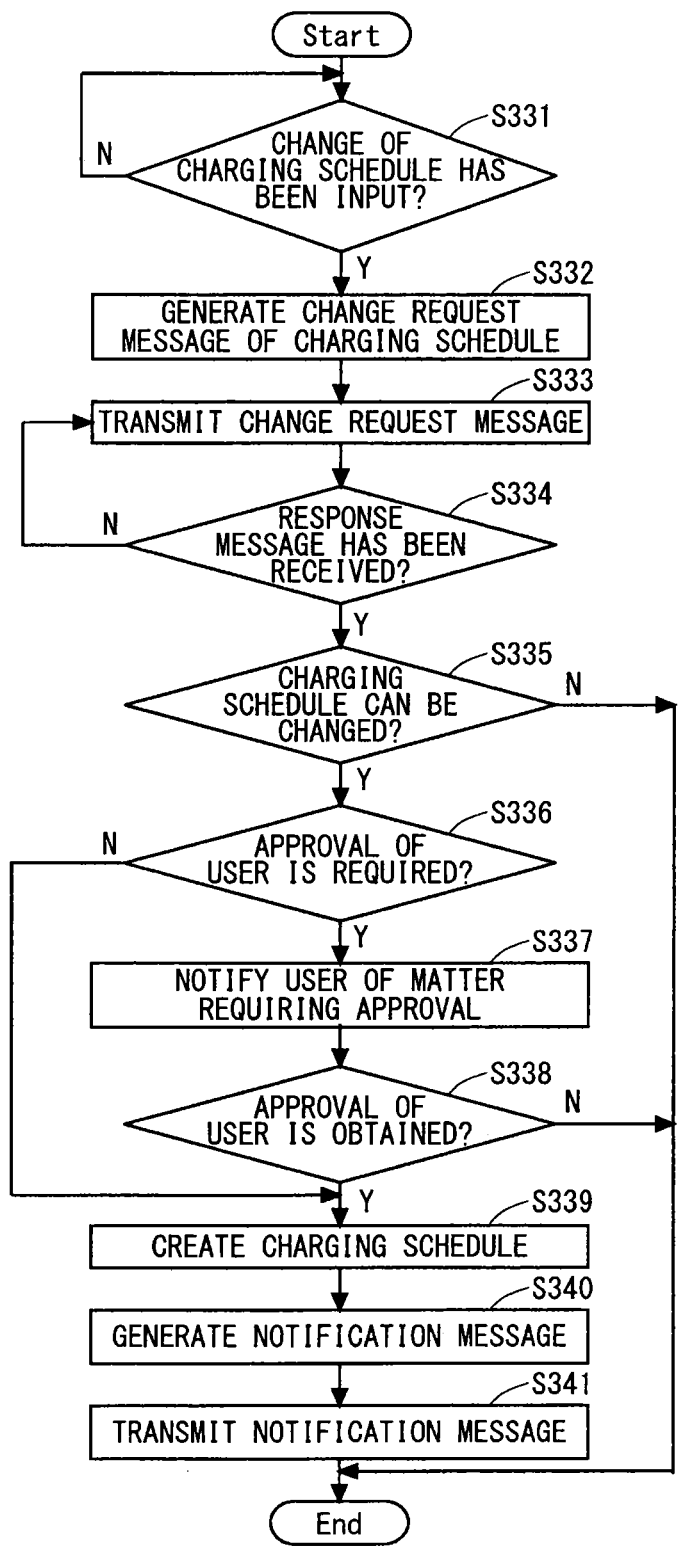

APPARATUS, CHARGING CONTROL APPARATUS, AND INFORMATION INPUT/OUTPUT APPARATUS

TECHNICAL FIELD

The present invention relates to an apparatus, a charging control apparatus, and an information input and output apparatus in supplying power to an in-vehicle battery with use of a charging cable (charging gun).

BACKGROUND ART

Electric vehicles and hybrid vehicles, which are equipped with batteries and powered by electricity, have recently been put into practical use. Charging facilities (charging control apparatuses) for feeding power to the batteries have also started to be installed in many areas as charging infrastructure.

In order to fully charge the batteries of the electric vehicles, however, a significant amount of power of about a dozen kilowatt-hours (equivalent to average power consumption per household for two to three days) is necessary.

Facilities (grids) for supplying power to the electric vehicles have thus been required to fulfill functions such as a load adjustment function and a power distribution control function, and a next-generation power network referred to as a "smart grid", in which a means for automatically controlling power supply and demand is incorporated, has attracted attention.

The charging facilities, however, have different infrastructure conditions (e.g., a limit value of current that a power switchboard or a breaker can output, and the amount of power that an electric utility company or a solar photovoltaic system can supply) depending on the area and the system configuration. The electric vehicles and hybrid vehicles are thus required to perform charging control in accordance with the charging facilities connected at their destinations.

To solve the above-mentioned problems, IEC61851, E-Mobility, and so on have been proposed as technology for charging electric vehicles connected to charging infrastructure (in IEC61851, the charging infrastructure notifies the vehicles of values of available power, current, voltage, and the like in real-time at charging; in E-Mobility, the charging infrastructure notifies the vehicles of detailed charging schedules, such as "power of 10 Kwh can be supplied from 10:00 a.m. to 12:00 a.m. for 20 yen per kilowatt-hour"). A method in which the charging control apparatus creates a charging schedule based on a charge required by a vehicle, and charges a battery based on the charging schedule has been examined (Patent Document 1).

PRIOR ART DOCUMENT

Patent Document

Patent Document 1: Japanese Patent Application Laid-Open Publication No. 2009-136109

SUMMARY OF INVENTION

Problems to be Solved by Invention

Such a method is a method for creating the charging schedule, but, after the charging schedule is once created by the charging control apparatus, the charging schedule cannot be changed unless a charging cable is re-inserted.

The present invention has been conceived to solve problems as mentioned above, and aims to provide an apparatus for changing a charging schedule without re-inserting a charging cable, a charging control apparatus, and an information input and output apparatus.

Means for Solving Problems

An apparatus according to the present invention is an apparatus for changing a charging schedule of a storage means installed in a vehicle, and includes: a communication device to receive a request for a change of the charging schedule, and acquire, from a charging control apparatus in a charging facility side, a charging parameter applied in a case where the charging schedule is changed; and a control device to create a new charging schedule after the change using a new charging parameter acquired from the charging control apparatus in the charging facility side. The communication device transmits the new charging schedule to the charging control apparatus in the charging facility side, and receives, from the charging control apparatus in the charging facility side, a response indicating whether implementation of the new charging schedule is possible.

A charging control apparatus in a charging facility side according to the present invention includes: a communication means for communicating with a vehicle in which a storage means is installed; and a power feeding control means for controlling feeding of power to the storage means in accordance with a charging schedule, and, when the communication means receives a request for a change of the charging schedule, the communication means notifies the vehicle of a charging parameter applied in a case where the charging schedule is changed.

An information input and output apparatus according to the present invention is an information input and output apparatus for communicating with a vehicle in which a storage means is installed, and, when a change of a charging schedule of the storage means is input, notifies the vehicle of a request for the change of the charging schedule; acquires information on a charging state of the storage means from the vehicle; acquires, from a charging control apparatus in a charging facility side that feeds power to the storage means, a charging parameter applied in a case where the charging schedule is changed; creates a new charging schedule after the change using the information on the charging state of the storage means as acquired and a new charging parameter; and transmits the new charging schedule to the charging control apparatus in the charging facility side, and receives, from the charging control apparatus in the charging facility side, a response indicating whether implementation of the new charging schedule is possible.

Effects of Invention

According to the present invention, with the above-mentioned configuration, the charging schedule can be changed without re-inserting a charging cable.

BRIEF DESCRIPTION OF DRAWINGS

FIG. 17 is a flow chart showing operation of an information terminal according to Embodiment 3 to change the charging schedule.

DESCRIPTION OF EMBODIMENTS

Embodiment 1

A charging system according to Embodiment 1 for implementing the present invention is described herein with use of FIGS. 1 to 8.

<Configuration of Charging System>

Figure 1:
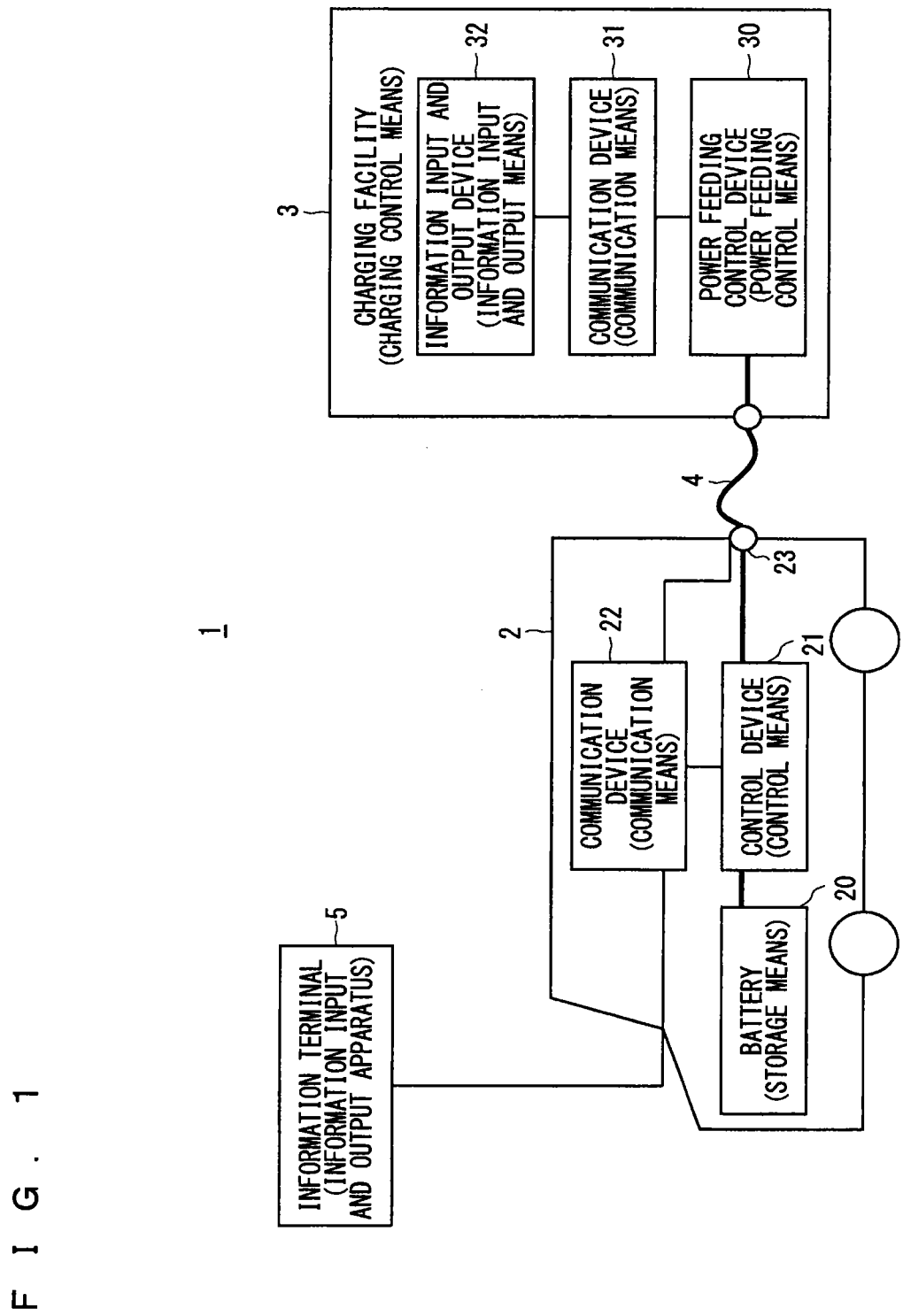
FIG. 1 is a schematic diagram of a charging system according to Embodiment 1.

FIG. 1 shows the configuration of the charging system according to Embodiment 1. In FIG. 1, the charging system 1 includes a vehicle 2, a charging facility (charging control means) 3, a charging cable (charging gun) 4, and an information terminal (information input and output apparatus) 5. The number of vehicles 2 included in the charging system 1 is not limited to one, and may be more than one.

Examples of the charging facility 3 are a charging station installed by the verge of a road, a meter installed at home, and a power feeding system in which at least one of a power distribution company and an electric utility company is connected to a charging station.

In a case where the charging facility 3 is the charging station, the charging cable 4 is included in the charging facility 3 as a part of the charging station. In a case where the charging facility 3 is the meter, the charging cable 4 may be a part of the vehicle 2. In this case, an end of the charging cable 4 is preferably a power supply plug that can be connected to an outlet.

Examples of the information terminal 5 are a mobile phone, a smartphone, and a car navigation apparatus. The information terminal 5 is used to input and output information necessary to create a charging schedule to and from the vehicle 2. Although the information terminal 5 is described herein as an apparatus different from the vehicle 2, the information terminal 5 may be incorporated in the vehicle 2 as a part of the vehicle 2.

(Configuration of Vehicle)

The vehicle 2 is an electric vehicle (electric motor vehicle). The vehicle 2 includes a battery (storage means) 20, a control device (control means) 21, a communication device (communication means) 22, and a charging port 23.

The vehicle 2 is not limited to a vehicle powered only by a motor driven by battery power, and includes, for example, a plug-in hybrid vehicle combining a motor and a gasoline engine.

The control device 21 is connected to the battery 20 and the charging port 23 through power lines, and is connected to the communication device 22 through a signal line. The control device 21 follows an instruction (or notification) from the communication device 22, and controls operation to charge the battery 20 with power supplied from a side of the charging port 23 (power supplied from the charging facility 3 through the charging cable 4) in accordance with the instruction (or notification).

The communication device 22 is used to communicate with a communication device 31 (described later) in a charging facility side using a first communication scheme (described later) and a second communication scheme (described later). In FIG. 1, the communication device 22 is connected to the control device 21, the charging port 23, and the information terminal 5 through signal lines.

The communication device 22 acquires information on whether the charging cable 4 is connected or not, a charging parameter of the battery 20, and the like through communication with the communication device 31 (described later) in the charging facility side. If there is any matter that an owner of the vehicle 2 should be asked about, the communication device 22 communicates with the information terminal 5 to acquire information on the matter from the information terminal 5.

(Configuration of Charging Facility)

The charging facility 3 includes a power feeding control device (power feeding control means) 30, the communication device (communication means) 31, and an information input and output device (information input and output means) 32.

In the case where the charging facility 3 is the charging station, for example, the power feeding control device 30 is connected to a power network of the power distribution company or the electric utility company and the charging cable 4 through power lines, and is connected to the communication device 31 through a signal line. The power feeding control device 30 controls power supply to a side of the charging cable 4 (the battery 20 of the vehicle 2) in accordance with an instruction from the communication device 31.

In the case where the charging facility 3 is the meter, the power feeding control device 30 is connected to the power network of the power distribution company or the electric utility company and an inlet of the charging cable 4 through power lines, and is connected to the communication device 31 through a signal line. In this case, the power feeding control device 30 also controls power supply to the side of the charging cable 4 (the battery 20 of the vehicle 2) in accordance with the instruction from the communication device 31.

In the case where the charging facility 3 is the power feeding system in which the power network of the power distribution company or the electric utility company is connected to the charging station, the power feeding control device 30 is connected to the charging cable 4 and the power network of the power distribution company or the like through power lines, and is connected to the communication device 31 through a signal line. In this case, the power feeding control device 30 exchanges, with the communication device 31, information on the amount of power that the power network can supply and the like. The power feeding control device 30 controls power supply to the side of the charging cable 4 (the battery 20 of the vehicle 2) in accordance with the instruction from the communication device 31.

The communication device 31 is used to communicate with the communication device 22 in a vehicle side using the first communication scheme (described later) and the second communication scheme (described later). In FIG. 1, the communication device 31 is connected to the power feeding control device 30, the information input and output device 32, and the charging cable 4 through signal lines.

The information input and output device 32 is, for example, an interface which is provided on the surface of the charging station, and through which a user inputs information to change a charging schedule or a manager of the facility reads the charging schedule. Specific examples of the information input and output device 32 are a touch panel, a keyboard, a mouse, a microphone, and a speaker.

The charging facility 3 is described herein to include the information input and output device 32, but, in a case where the charging schedule is changed through the information terminal 5 or the communication device 22 in the vehicle side, the information input and output device 32 is not an essential component of the charging facility 3.

<Communication Scheme in Charging System>

The following describes the first communication scheme and the second communication scheme of communication performed in the charging system 1.

(First Communication Scheme)

The first communication scheme is a pulse wide modulation (PWM) communication scheme. In this communication scheme, communication is performed by changing the duty ratio of a pulse wave of a signal for modulation. An example of communication performed using the first communication scheme is communication (control pilot communication) using a control pilot signal specified by IEC61851.

In the control pilot communication, a signal line inside the charging cable 4 is used to control a change in level of voltage (signal line voltage) of the signal line to thereby transfer information.

The control pilot communication is used, for example, in a case where the vehicle 2 and the charging facility 3 mutually detect connection therebetween through the charging cable 4, a case where the vehicle 2 and the charging facility 3 mutually detect detachment of the charging cable 4 from the vehicle 2 or the charging facility 3, a case where electric leakage is detected, a case where a timing at which power line communication (hereinafter, referred to as PLC; described later) is started or suspended is detected, a case where the vehicle 2 notifies the charging facility 3 that the battery 20 is in a chargeable state, and a case where the charging facility 3 notifies the vehicle 2 of a maximum value (maximum supply current value) of current that the charging facility 3 can supply.

(Second Communication Scheme)

The second communication scheme is a spread spectrum communication scheme such as orthogonal frequency-division multiplexing (OFDM). An example of communication performed using the second communication scheme is PLC.

As in the control pilot communication, the signal line (an existing signal line for control pilot communication) inside the charging cable 4 is used in the PLC. In addition, a signal in a frequency band (e.g., approximately 2 MHz to 30 MHz) less affected by interference from a signal in a frequency band (e.g., approximately 1 KHz) used in the control pilot communication is used in the PLC.

The PLC is used, for example, in a case where information (e.g., the amount of remaining power, a command to start or suspend charging, and designation of a value of current at charging) on charging is transmitted and received, a case where information to control discharging from the vehicle 2 to a power provider is transmitted and received, and a case where contract information and identification information used in billing processing for charging are transmitted and received.

The control pilot communication and the PLC are described herein to use the same signal line as a communication channel, but may use different signal lines as communication channels. The control pilot communication and/or the PLC may be wireless communication. If the control pilot communication and the PLC are wired communication, however, security can be ensured with simpler configuration of a communication network.

<Operation of Charging System>

Operation of the charging system 1 is described herein.

In a case where the battery 20 of the vehicle 2 is charged, a charging connector (not illustrated) of the charging cable 4 is inserted into the charging port 23 of the vehicle 2. The vehicle 2 and the charging facility 3 are thereby connected through the charging cable 4. When the vehicle 2 and the charging facility 3 detect insertion of the charging cable 4 into the vehicle 2, the vehicle 2 and the charging facility 3 mutually transmit and receive information necessary for charging using the first communication scheme and the second communication scheme to acquire the information.

The following describes communication (initial connection, a common session, and a charging session) performed between the vehicle 2 and the charging facility 3. In particular, the charging session is described in detail as it is operation characterizing the present invention.

(Initial Connection)

The vehicle 2 and the charging facility 3 perform communication using a communication protocol (e.g., IPv6) at the network layer (layer 3) of the Open Systems Interconnection (OSI) Reference Model. In this case, the PWM communication and the OFDM communication are used at the physical layer (layer 1).

Specifically, the vehicle 2 acquires its own IP address and an IP address of the charging facility 3, and opens a session with the charging facility 3. Communication between the vehicle 2 and the charging facility 3 is preferably performed using a protocol at the transport layer (layer 4) to maintain security.

(Common Session)

After opening the session, the vehicle 2 and the charging facility 3 perform communication using a communication application at the application layer (layer 7). In this case, at the physical layer (layer 1), the PLC is performed, or both of the PWM communication and the OFDM communication are performed.

In the common session, confirmation of corresponding services, exchange of information on the corresponding services, selection of a billing method, authentication after selection of the billing method, exchange of charging parameters, and the like are performed, for example. A charging parameter exchange sequence is described below.

Charging Parameter Exchange Sequence (1) The vehicle 2 transmits a notification message including its own (vehicle's) charging parameter (e.g., an ID) to the charging facility 3.

(2) When the charging facility 3 receives the notification message, the charging facility 3 returns a response message including a charging parameter (e.g., information on a power supply schedule, such as charging start time, estimated charging end time, the amount of supplied power, and a power rate per unit time) of the charging facility 3.

(3) When the vehicle 2 receives the response message, the charging parameter exchange sequence ends.

(Charging Session)

Figure 2:
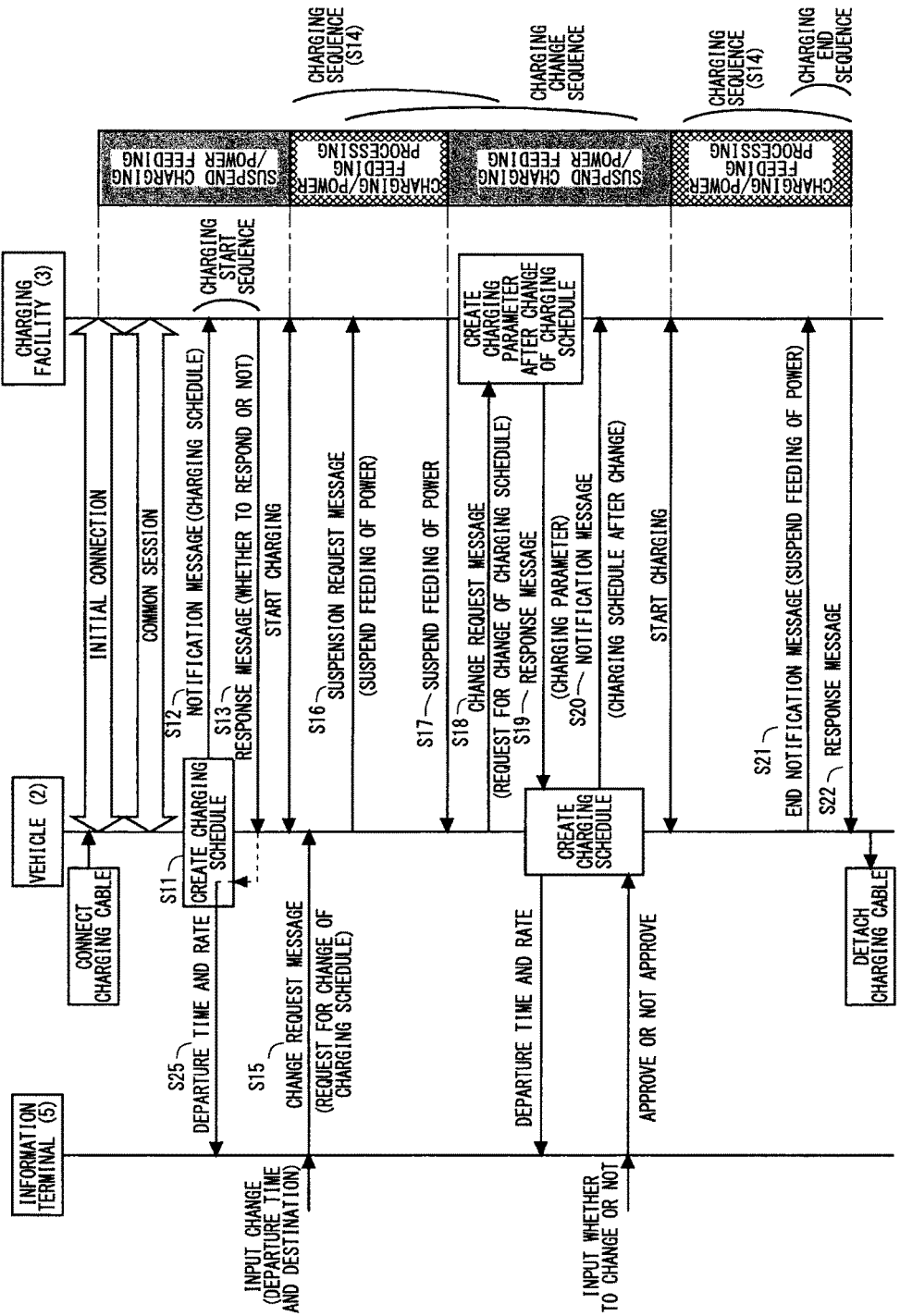
FIG. 2 shows a sequence in the charging system according to Embodiment 1.

After the common session, the vehicle 2 and the charging facility 3 perform the charging session as shown in FIG. 2. In the charging session, a charging start sequence and a charging sequence are performed. Each sequence of the charging session is described below in details.

Charging Start Sequence

The charging start sequence corresponds to steps S11 to S13 and step S25 of FIG. 2.

(1) The vehicle 2 creates a charging schedule based on the charging parameter of the charging facility 3 acquired in the charging parameter exchange sequence of the common session (step S11).

(2) The vehicle 2 transmits a notification message including information on whether the vehicle 2 can be charged or not and information on its own charging schedule generated based on the charging schedule (step S12).

(3) When the charging facility 3 receives the notification message, the charging facility 3 returns a response message including information on whether the charging facility 3 can respond to the charging schedule or not to the vehicle 2 (step S13).

(4) If the vehicle 2 receives the response message including information indicating that the charging facility 3 can respond to the charging schedule, the vehicle 2 calculates charging end time and a power rate necessary for charging based on the charging schedule and the charging parameter of the charging facility 3, notifies the information terminal 5 of the results of calculation (charging end time and power rate) (step S25), and ends the charging start sequence.

For example, the above-mentioned charging schedule is created so that power at time at which a power rate per unit time is low is preferentially used in a predetermined time period from the charging start time to perform charging with a predetermined amount of power, and the above-mentioned charging end time is derived from the charging schedule thus created.

After receiving, from the charging facility 3, the response message including the information indicating that the charging facility 3 can respond to the charging schedule in step S13, the vehicle 2 notifies the information terminal 5 of the charging end time and the power rate necessary for charging. It is desirable that the information terminal 5 store charging reservation information indicating the received charging end time and power rate in a storage device such as RAM so that the charging end time and the power rate are in effect and can be referenced by the information terminal 5 at any time until charging processing of the vehicle 2 is completed.

In a case where the information terminal 5 can communicate with a server apparatus through wireless communication such as 3G, Long Term Evolution (LTE), and Wireless Fidelity (Wi-Fi), the above-mentioned charging reservation information may be stored in the server apparatus through wireless communication, or may be stored in a storage device such as an HDD (e.g., non-volatile memory within the control device 21 or the communication device 22) installed in the vehicle 2 so that the stored charging reservation information is referenced.

If the vehicle 2 receives the response message including information indicating that the charging facility 3 cannot respond to the charging schedule, the vehicle 2 returns to step S11 to generate the charging schedule again.

If the vehicle 2 does not receive the response message within a predetermined time period, the vehicle 2 also returns to step S11 to transmit the notification message again.

With such configuration, the reliability of the charging start sequence can be improved.

[Operation of Vehicle to Start Charging]

Figure 3:
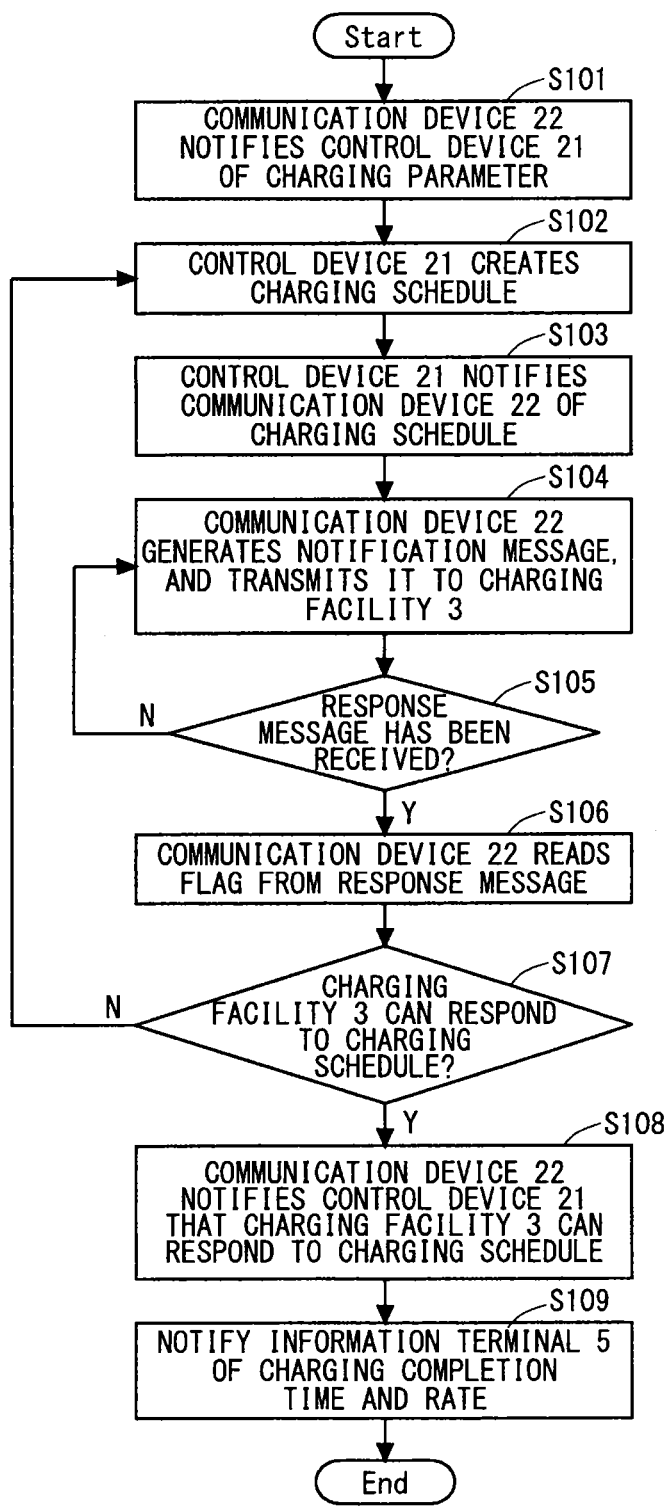
FIG. 3 is a flow chart showing operation of a vehicle according to Embodiment 1 to start charging.

Operation of the vehicle 2 is described herein with use of the flow chart of FIG. 3.

The communication device 22 notifies the control device 21 of the acquired charging parameter (step S101). The control device 21 creates the charging schedule based on the charging parameter (step S102). The control device 21 notifies the communication device 22 of the created charging schedule (step S103). The communication device 22 generates the notification message including the information on the charging schedule generated by the control device 21, and transmits the notification message to the charging facility 3 (step S104).

The communication device 22 judges whether the response message has been received from the charging facility 3 for each predetermined cycle or at a given timing (step S105).

If the response message has been received, the communication device 22 reads, from the response message, a flag (or code) indicating whether the charging facility 3 can respond to the transmitted charging schedule (step S106). On the other hand, if the response message has not been received, the communication device 22 returns to step S104 to transmit the notification message to the charging facility 3 again. In a case where the number of times the notification message is transmitted exceeds a predetermined number, however, the communication device 22 realizes that the charging facility 3 capable of feeding power does not exist in the charging system 1, and ends processing in the charging start sequence.

In a case where the processing in the charging start sequence ends, the communication device 22 preferably notifies the information terminal 5 that charging cannot be started. This allows a user of the information terminal 5 to understand that charging cannot be started.

The communication device 22 judges whether a value of the read flag indicates that the charging facility 3 can respond to the charging schedule (step S107). If the value of the flag indicates that the charging facility 3 can respond to the charging schedule, the communication device 22 notifies the control device 21 accordingly (step S108). The control device 21 calculates the above-mentioned charging end time and power rate necessary for charging, notifies the information terminal 5 of the calculation results through the communication device 22 (step S109), and then ends the charging start sequence. If the value of the flag indicates that the charging facility 3 cannot respond to the charging schedule, the communication device 22 returns to step S102 to generate the charging schedule again.

Although the communication device 22 is described herein to read the value of the flag, the communication device 22 may notify the control device 21 of the response message without reading the value of the flag. In this case, the control device 21 reads the value of the flag from the response message, and judges whether the charging facility 3 can respond to the charging schedule transmitted from the vehicle 2.

If the value of the flag indicates that the charging facility 3 can respond to the charging schedule, the control device 21 notifies the communication device 22 accordingly, and ends the charging start sequence. If the value of the flag indicates that the charging facility 3 cannot respond to the charging schedule, the control device 21 notifies the communication device 22 accordingly. The communication device 22 returns to step S102 to generate the charging schedule again.

The communication device 22 is described herein to transmit the notification message again if the communication device 22 does not receive the response message including the information indicating that the charging facility 3 can respond to the schedule. In a case where such a response message is not received, however, the communication device 22 may end the processing in the charging start sequence without transmitting the notification message again.

In a case where the charging facility 3 can start charging processing only through PWM communication (e.g., a case where the duty ratio in the PWM communication indicates a predetermined range of 10% to 85%, for example), processing may transition to a charging sequence using only the PWM communication after the end of the charging start sequence.

The control device 21 and the communication device 22 are described herein as separate devices. They, however, may be a program. The program may further include one or more programs. In the case of a plurality of programs, they are driven by the same computer or by separate computers.

[Operation of Charging Facility to Start Charging]

Figure 4:
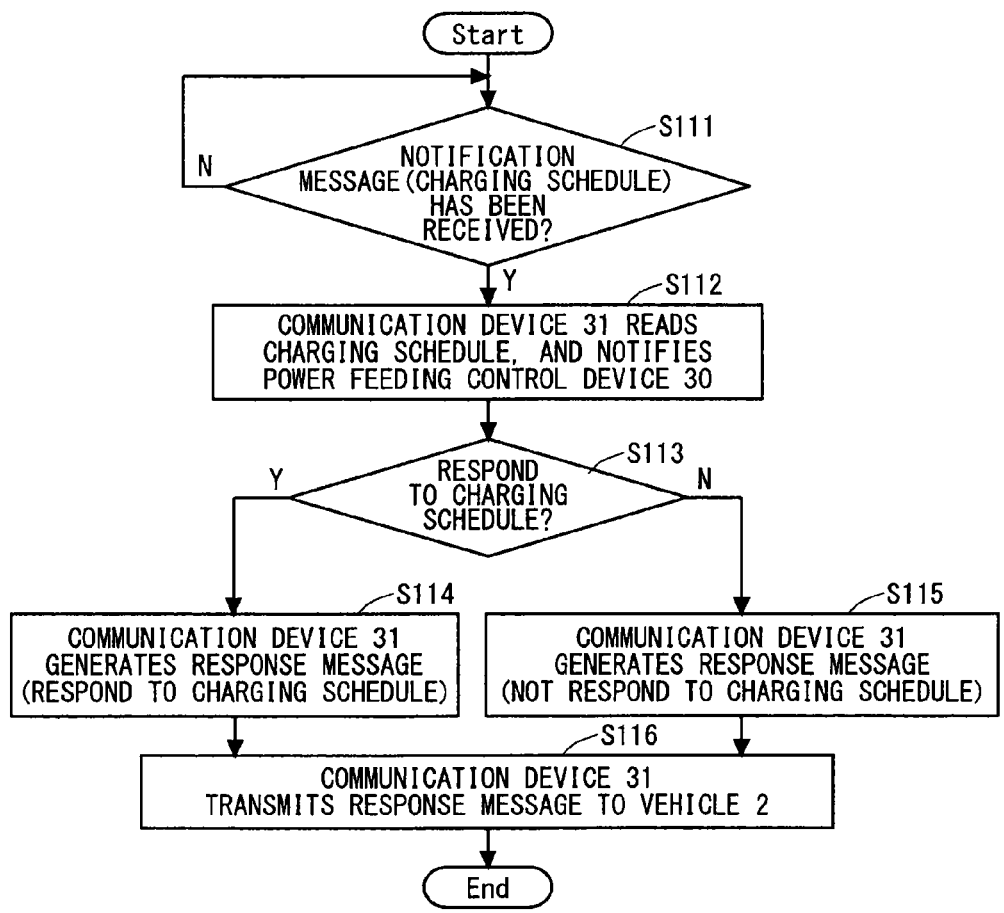
FIG. 4 is a flow chart showing operation of a charging facility according to Embodiment 1 to start charging.

Operation of the charging facility 3 is described herein with use of the flow chart of FIG. 4.

The communication device 31 judges whether the notification message including the information on the charging schedule generated by the vehicle 2 has been received for each predetermined cycle or at a given timing (step S111). If the notification message has not been received, the communication device 31 returns to a state before step S111. On the other hand, if the notification message has been received, the communication device 31 reads the information on the charging schedule of the vehicle 2, and notifies the power feeding control device 30 of the read information (step S112). The power feeding control device 30 judges, with reference to its own power feeding schedule, whether the power feeding control device 30 can respond to the charging schedule of the vehicle 2. The power feeding control device 30 notifies the communication device 31 of the judgment results (step S113).

The communication device 31 generates the response message to the notification message. If the power feeding control device 30 can respond to the charging schedule, the communication device 31 includes the results (indicating that the power feeding control device 30 can respond to the charging schedule) received from the power feeding control device 30 in the response message as the value of the flag (or code) (step S114). If the power feeding control device 30 cannot respond to the charging schedule, the communication device 31 includes the results indicating that the power feeding control device 30 cannot respond to the charging schedule in the response message as the value of the flag (or code) (step S115).

The communication device 31 transmits the generated response message to the vehicle 2 (step S116), and ends the charging start sequence.

In a case where the communication device 31 cannot correctly receive the notification message, a flag (or code) indicating the error can be included in the response message.

The power feeding control device 30 and the communication device 31 are described herein as separate devices. They, however, may be a program. The program may further include one or more programs. In the case of a plurality of programs, they are driven by the same computer or by separate computers.

Charging Sequence

After the charging start sequence, the charging system 1 performs the charging sequence in accordance with the charging schedule. The charging sequence corresponds to step S14 of FIG. 2.

The battery 20 of the vehicle 2 can be charged by two methods, namely, AC charging and DC charging. The charging system 1 performs the charging sequence in accordance with either AC charging or DC charging.

A charging request message herein includes information on a charging preparation state of the vehicle 2, a value of target current, a value of target voltage, a maximum value of allowable voltage, a maximum value of allowable current, a maximum value of allowable power, state of charge (SOC) of the vehicle, and whether full charging of the battery has been completed or not, for example.

The response message includes information on the state of the charging facility 3, a current value of output current, a current value of voltage, a limit value of allowable voltage, a limit value of allowable current, and a limit value of allowable power, for example.

Charging Change Sequence

A charging change sequence corresponds to steps S15 to S20 of FIG. 2.

(2) When a change of the charging schedule is input from the user into the information terminal 5, the information terminal 5 generates and transmits a change request message requesting the change of the charging schedule (step S15). In this case, information on at least one of departure time, the destination, and the amount of charging power after the change is input from the user into the information terminal 5 along with the change of the charging schedule, and the change request message requesting the change of the charging schedule similarly includes at least one of the departure time, destination information (the latitude and the longitude of the destination or a name and an address of a facility) indicating the destination, and the amount of charging power after the change.

The amount of charging power may be calculated using a value calculated by the information terminal 5 using a traveling distance to the destination, or may be calculated by the vehicle 2 or the charging facility 3 in a similar manner as the change request message requesting the change of the charging schedule is transferred to the vehicle 2 and the charging facility 3 (S15 and S18).

(2) When the vehicle 2 receives the change request message, the vehicle 2 generates and transmits a suspension request message requesting the charging facility 3 to suspend charging (step S16). In this case, it is desirable to set signal voltage of the above-mentioned PWM communication line to a predetermined value (e.g., 9 [V] indicating that the vehicle 2 cannot be charged) to indicate that the vehicle 2 is changing the charging schedule.

The suspension request message includes charging suspension reason information indicating information such as the "end of charging" and a "change of a charging schedule", and, in the above-mentioned case, the charging suspension reason information indicates the change of the charging schedule.

(3) If the charging facility 3 receives the suspension request message including the first charging suspension reason information, i.e., the "change of the charging schedule", the charging facility 3 suspends feeding of power to the vehicle 2, for example, by opening a contactor of a power line for feeding power, and is in a state of waiting to receive the change request message requesting the change of the charging schedule (step S17).

In this case, the charging facility 3 preferably stores the charging schedule (an old charging schedule) before the change, which has been allowed with respect to the vehicle 2 in the above-mentioned charging start sequence, in a storage device such as memory so that charging processing in accordance with the charging schedule before suspension of feeding of power can be continued.

Charging processing may be performed in accordance with the old charging schedule in a case where the charging facility 3 does not receive the change request message requesting the change of the charging schedule or in a case where the charging facility 3 receives a charging start message from the vehicle 2 before processing in response to the request for the change of the charging schedule is completed (before a response message including information indicating that the charging facility 3 can respond to the notification message is received from the charging facility 3 in step S19 described later).

If the charging facility 3 receives the suspension request message including the second charging suspension reason information, i.e., the "end of charging", the charging facility 3 promptly suspends feeding of power to the vehicle 2, and may not store the old charging schedule in the storage device such as the memory.

(4) After transmitting the suspension request message including the first charging suspension reason information, i.e., the "change of the charging schedule", the vehicle 2 transmits the change request message requesting the change of the charging schedule to the charging facility 3 (step S18).

(5) When the charging facility 3 receives the change request message, the charging facility 3 generates a charging parameter (e.g., a power rate per unit time, charging start time, estimated charging end time, and the amount of supplied power) applied in a case where the charging schedule is changed. The charging facility 3 transmits a response message including the charging parameter to the vehicle 2 (step S19).

The charging parameter included in the response message preferably satisfies a condition (e.g., a power rate per unit time, charging start time, estimated charging end time, and the amount of supplied power) before the change of the charging schedule.

(6) The vehicle 2 receives the response message, includes information (e.g., state of charge (SOC) and a flag indicating that charging is being performed or suspended) on the current charging state of the battery 20 in the response message, and transfers the resultant response message to the information terminal 5. The vehicle 2 may separately communicate with the information terminal 5 to notify the information terminal 5 of the information on the current charging state of the battery 20.

The above-mentioned SOC herein indicates a ratio of the amount of power stored in the battery to the amount of power stored when the battery is fully charged.

For example, when power of 5 kwh is stored in a battery that stores power of 10 kwh when being fully charged, the SOC of the battery is 50% (=(5 [KWh]÷10 [KWh])×100).

(7) When the information terminal 5 receives the response message, the information terminal 5 acquires the information on the current charging state of the battery 20 and the charging parameter, and creates the charging schedule after the change using the acquired information on the current charging state of the battery 20 and the charging parameter. The information terminal 5 generates a notification message including the newly created charging schedule after the change, and transmits the notification message to the charging facility 3 (step S20).

If approval of the user is required, the information terminal 5 calculates change detail information indicating, for example, a difference (difference in departure time or power rate) between the above-mentioned charging reservation information (departure time and power rate) before the change and the charging reservation information after the change, and notifies the information terminal 5 of the change detail information.

For example, in the case of the charging reservation information 1 (charging end time X1 and power rate Y1) before the change and the charging reservation information 2 (charging end time X2 and power rate Y2) after the change, the change detail information may be calculated to indicate a difference (difference in departure time $\Delta X=X2-X1$, difference in power rate $\Delta Y=Y2-Y1$) therebetween.

For example, in a case where time is indicated by UTC time (in seconds elapsed since 00:00:00 on Jan. 1, 1970) (the UNIX (registered trademark) epoch), and the power rate is indicated in yen, a positive value of the difference $\Delta X$ in departure time means that the departure time will delay $|\Delta X|$ seconds, and a negative value of the difference $\Delta X$ in departure time means that charging will be completed $|\Delta X|$ seconds earlier ($|\Delta X|$ indicates the absolute value of $\Delta X$).

Similarly, a positive value of the difference $\Delta Y$ in power rate means that the power rate necessary for charging will increase by $|\Delta Y|$ yen, and a negative value of the difference $\Delta Y$ in power rate means that the power rate will decrease by $|\Delta Y|$ yen.

The information terminal 5 converts the change detail information into text information or sound information such as "The departure time will be 10:30 (09:30 before change), but the rate will decrease by 300 yen", notifies the user of the text information or the sound information, and receives input of approval from the user.

(8) When the charging facility 3 receives the notification message, the charging facility 3 ends the charging change sequence.

In a case where the information terminal 5 having received the response message judges that the charging schedule cannot be changed (e.g., a case where a desired charging schedule cannot be created from the charging parameter after the change and a case where approval cannot be obtained from the user), the information terminal 5 includes the information in the notification message, and transmits the resultant notification message to the charging facility 3.

Although the information terminal 5 is described herein to receive the response message, the vehicle 2 may receive the response message. In this case, the vehicle 2 creates a new charging schedule, and transmits the new charging schedule to the charging facility 3.

In the above-mentioned description, the vehicle 2 creates the charging schedule and the charging reservation information, and notifies the information terminal 5 of the charging schedule and the charging reservation information, and the information terminal 5 creates the change detail information (e.g., "The departure time will be 10:30 (09:30 before change), but the rate will decrease by 300 yen") indicating the difference of the charging reservation information after the change. However, the information terminal 5 may create the charging schedule and the charging reservation information, and the vehicle 2 may create the change detail information.

In conventional technology, in a case where the suspension request message is received, the charging facility 3 treats it as the end of the charging schedule, and thus re-insertion of a charging plug is required to exchange the charging schedule between the vehicle 2 and the charging facility 3 again and start charging.

By including the charging suspension reason information indicating the information such as the "end of charging" and the "change of the charging schedule" in the suspension request message as described above, in the case where the charging facility 3 receives the suspension request message including the charging suspension reason information indicating the "change of the charging schedule", the suspension request message is not treated as the end of the charging schedule as in the conventional technology but is treated as the change (i.e., suspension) of the schedule, and, as a result, the charging schedule can be changed, and charging can be started again without re-inserting the charging plug.

The information terminal 5 can acquire or calculate the difference between the charging reservation information (departure time and power rate) before the change and the charging reservation information after the change to produce the effects of providing the user with information for judging whether the charging schedule can be changed.

[Operation of Information Terminal to Change Charging Schedule]

Figure 5:
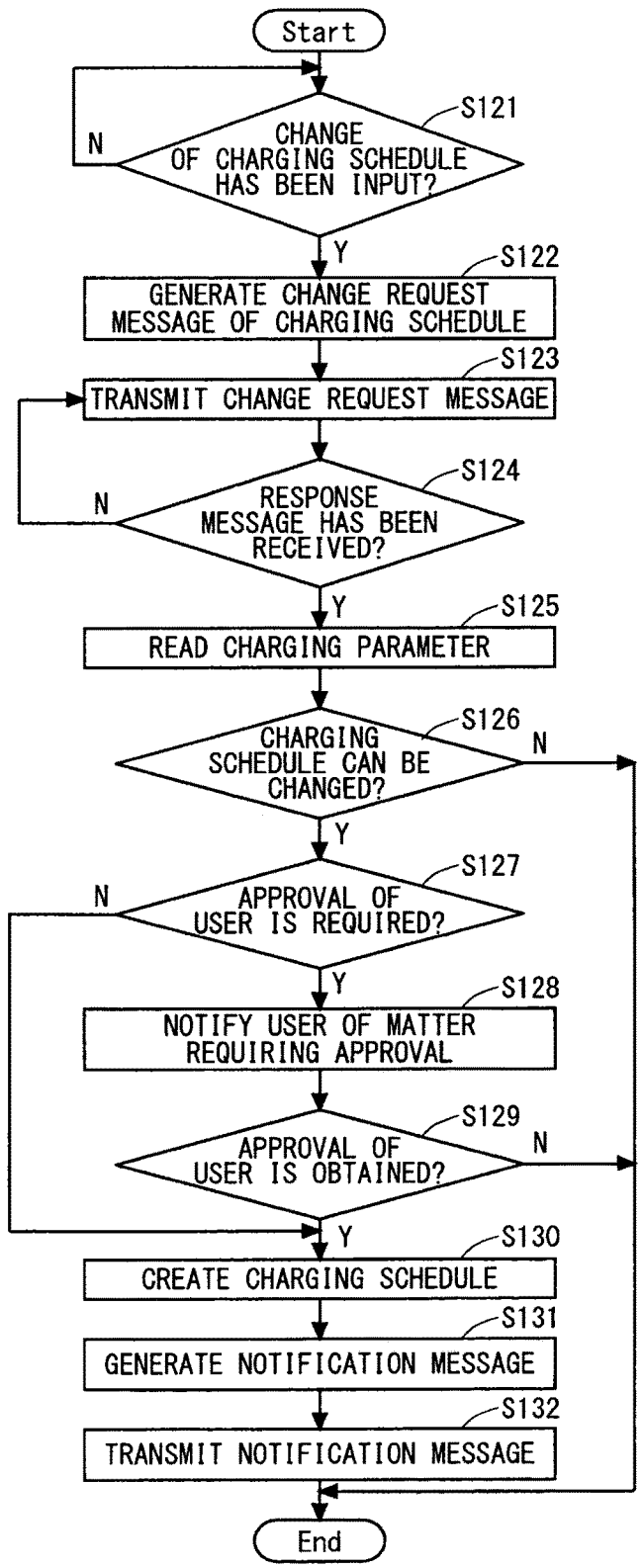
FIG. 5 is a flow chart showing operation of an information terminal according to Embodiment 1 to change a charging schedule.

Operation of the information terminal 5 is described herein with use of the flow chart of FIG. 5.

The information terminal 5 judges whether the change of the charging schedule has been input from the user for each predetermined cycle or at a given timing (step S121). If the information terminal 5 judges that the change of the charging schedule has not been input, the information terminal 5 returns to a state before step S121. On the other hand, if the information terminal 5 judges that the change of the charging schedule has been input, the information terminal 5 generates the change request message requesting the change of the charging schedule (step S122). The information terminal 5 transmits the generated change request message to the vehicle 2 (step S123).

The information terminal 5 judges whether the response message has been received for each predetermined cycle or at a given timing (step S124). If the response message has been received, the information terminal 5 reads the new charging parameter from the response message (step S125). On the other hand, if the response message has not been received, the information terminal 5 returns to step S123 to transmit the change request message to the vehicle 2 again.

Since the information terminal 5 transmits the change request message again if there is no response to the change request message, reliability of the charging change sequence can be improved.

In a case where the number of times the notification message is transmitted exceeds a predetermined number, however, the information terminal 5 realizes that the charging facility 3 cannot respond to the change of the charging schedule, and ends processing in the charging change sequence. In this case, the information terminal 5 preferably notifies the user that the information terminal 5 judges that the charging schedule cannot be changed. As a result, the user can attempt to change the charging schedule again as necessary.

The information terminal 5 judges whether the read charging parameter includes a flag (or code) indicating that the charging schedule cannot be changed (step S126). If the information terminal 5 judges that the flag indicating that the charging schedule cannot be changed is included, the information terminal 5 realizes that the charging facility 3 cannot respond to the change of the charging schedule, and ends processing in the charging change sequence. In this case, the information terminal 5 also preferably notifies the user that the information terminal 5 judges that the charging schedule cannot be changed.

If the information terminal 5 judges that the flag indicating that the charging schedule cannot be changed is not included, the information terminal 5 judges whether the read charging parameter includes any matter that requires approval of the user (step S127). If the information terminal 5 judges that the matter that requires the approval of the user is included, the information terminal 5 notifies the user of the matter that requires the approval of the user (step S128). In this case, the information terminal 5 preferably converts information on the charging parameter into at least one of delay time of departure and a power rate for notification.

The information terminal 5 receives input from the user, and judges whether the approval can be obtained (step S129). If the approval of the user can be obtained, processing proceeds to next step S130 (described later). If the approval of the user cannot be obtained within a predetermined time period, the information terminal 5 judges that the charging schedule cannot be changed, and ends processing in the charging change sequence. In this case, the information terminal 5 preferably notifies the user that the information terminal 5 judges that the charging schedule cannot be changed. In a case where the request for the change of the charging schedule is input from the user again, the information terminal 5 repeats operation in and after step S122.

If the matter that requires the approval of the user is not included in step S127, and if the approval of the user can be obtained in step S129, the information terminal 5 creates the charging schedule using the read charging parameter and the information on the current charging state of the battery 20 (step S130). The information terminal 5 generates the notification message including information on the newly created charging schedule after the change (step S131).

The information terminal 5 transmits the notification message to the charging facility 3 (step S132), and ends processing in the charging change sequence.

The information terminal 5 may also transmit the notification message to the vehicle 2. In this case, the vehicle 2 understands the change of the charging schedule, and can control charging of the battery 20 in accordance with the charging schedule after the change.

[Operation of Vehicle to Change Charging Schedule]

Figure 6:
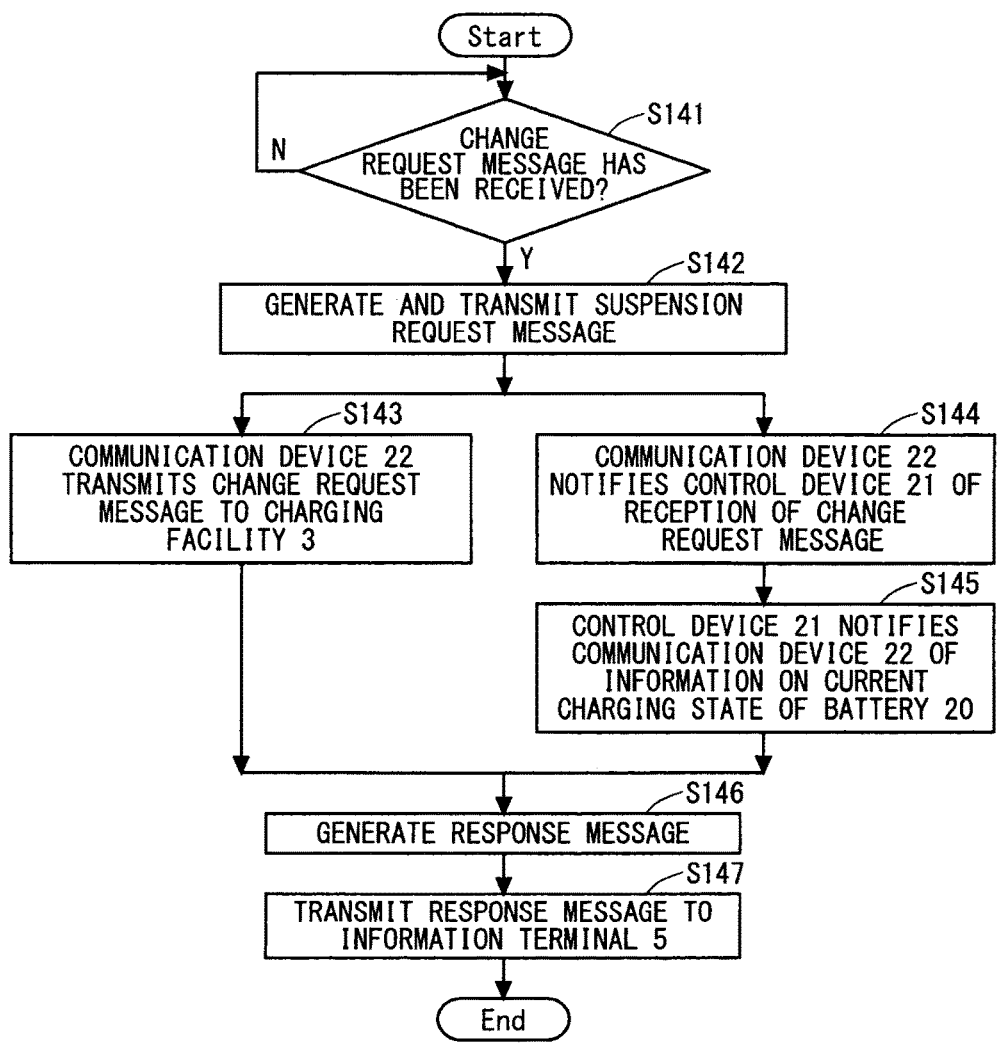
FIG. 6 is a flow chart showing operation of the vehicle according to Embodiment 1 to change the charging schedule.

Operation of the vehicle 2 is described herein with use of the flow chart of FIG. 6.

The communication device 22 judges whether the change request message has been received from the information terminal 5 for each predetermined cycle or at a given timing (step S141). If the change request message has not been received, the communication device 22 returns to a state before step S141.

If the change request message has been received, the communication device 22 generates the suspension request message requesting suspension of charging, and transmits the suspension request message to the charging facility 3 (step S142). The communication device 22 then transmits the change request message to the charging facility 3 (step S143).

The communication device 22 notifies the control device 21 that the change request message has been received (step S144). The control device 21 notifies the communication device 22 of the information on the current charging state of the battery 20 and the like (step S145).

The communication device 22 generates the response message including the information on the current charging state of the battery 20 and the like received from the control device 21 (step S146). The communication device 22 transmits the generated response message to the information terminal 5 (step S147), and ends processing in the charging change sequence.

After transmitting the response message to the information terminal 5, the communication device 22 preferably transmits the response message again in a case where the notification message including the charging schedule after the change is not received from the information terminal 5 within a predetermined time period.

Since the communication device 22 transmits the response message again, reliability of the change request sequence can be improved.

Instead of performing processing in steps S146 and S147, the communication device 22 may preferably include the information on the current charging state of the battery 20 in the response message received from the charging facility 3, and transmit the resultant response message to the information terminal 5.

Instead of receiving the notification message from the information terminal 5, the communication device 22 preferably receives a message that is the same as the notification message transmitted by the information terminal 5 to the charging facility 3 to acquire the charging schedule after the change.

The charging schedule after the change has been described to be created by the information terminal 5 so far, but may be created by the vehicle 2. For example, in a case where the charging parameter that requires the approval of the user is not included, security is easily ensured if the vehicle 2 creates the charging schedule after the change. In addition, the configuration of at least one of the vehicle 2 and the information terminal 5 can be simplified.

Figure 7:
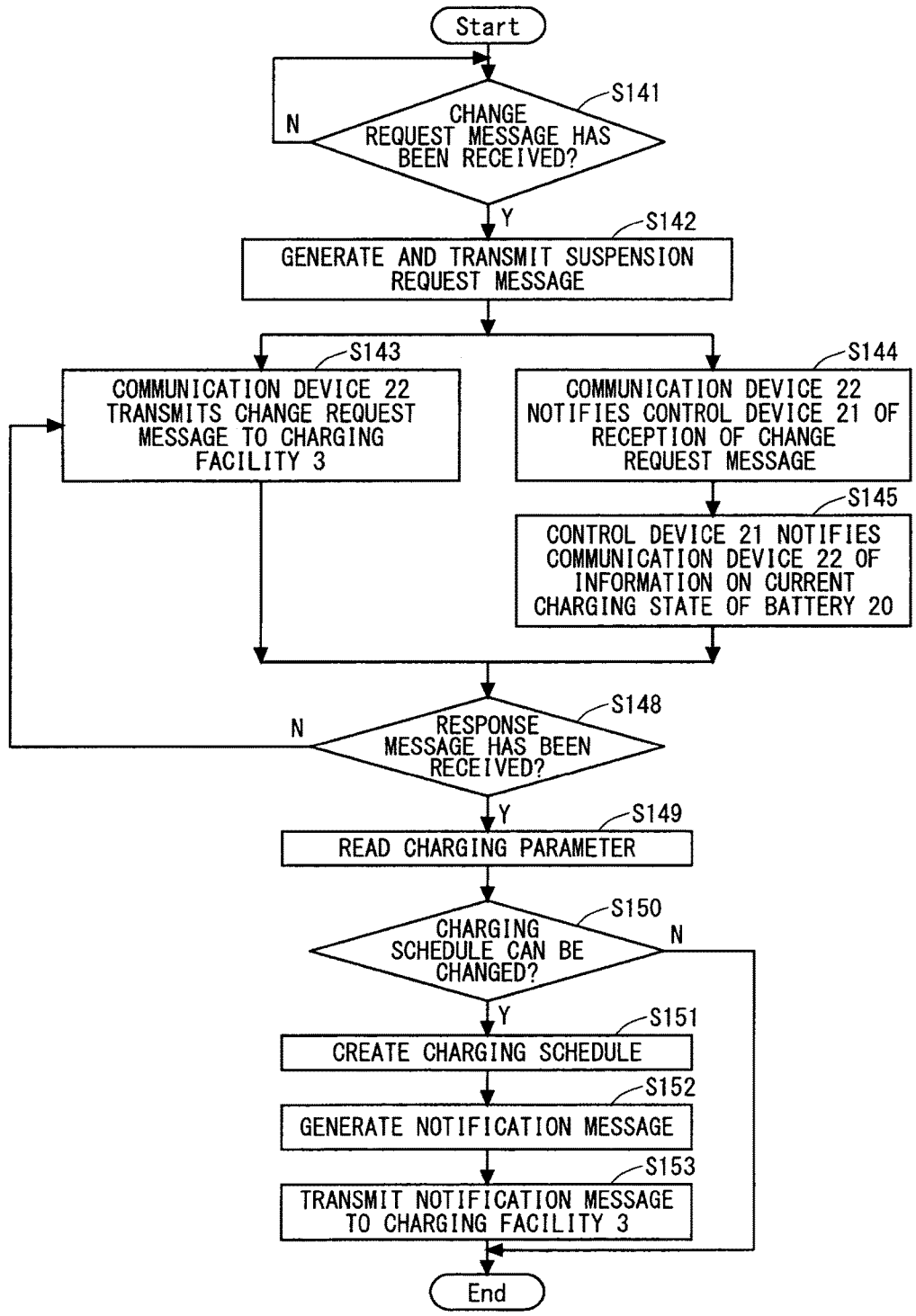
FIG. 7 is a flow chart showing alternative operation of the vehicle according to Embodiment 1 to change the charging schedule.

Operation of the vehicle 2 in this case is described with use of the flow chart of FIG. 7. Operation in steps S141 to S145 is the same as that in FIG. 6, and thus description thereof is omitted.

After step S145, the communication device 22 judges whether the response message has been received from the charging facility 3 for each predetermined cycle or at a given timing (step S148). The response message includes the charging parameter applied in the case where the charging schedule is changed.

If the response message has been received, the communication device 22 reads the charging parameter applied after the change of the charging schedule, and notifies the control device 21 of the read charging parameter (step S149).

On the other hand, if the response message has not been received within a predetermined time period, the communication device 22 returns to step S143 to transmit the change request message to the charging facility 3 again.

In a case where the number of times the notification message is transmitted exceeds a predetermined number, however, the communication device 22 judges that the charging facility 3 cannot respond to the change of the charging schedule, and ends processing in the charging change sequence.

In this case, the communication device 22 preferably notifies the information terminal 5 that the charging facility 3 cannot respond to the change of the charging schedule. With such configuration, the user can attempt to change the charging schedule again as necessary.

The control device 21 judges whether the charging schedule can be changed based on the charging parameter read in step S149 (step S150). If the flag (or code) indicating that the charging schedule cannot be changed is included, the control device 21 judges that the charging facility 3 cannot respond to the change of the charging schedule, and ends processing in the charging change sequence.

In a case where the processing in the charging change sequence ends, the communication device 22 or the control device 21 preferably notifies the information terminal 5 that charging cannot be changed. This allows the user of the information terminal 5 to understand that the charging schedule cannot be changed, and request the change of the charging schedule again as necessary.

If the control device 21 judges that the charging schedule can be changed, the control device 21 newly creates the charging schedule after the change using the charging parameter received from the communication device 22 and the current charging state of the battery 20 (step S151). The control device 21 notifies the communication device 22 of the newly created charging schedule. The communication device 22 generates the notification message including information on the new charging schedule (step S152). The communication device 22 transmits the notification message to the charging facility 3 (step S153), and ends the charging change sequence.

The communication device 22 is described herein to transmit the change request message again in a case where the communication device 22 does not receive the response message. In the case where the response message is not received, however, the communication device 22 may end processing in the charging change sequence without transmitting the change request message again.

The control device 21 and the communication device 22 are described herein as separate devices. As in the charging start sequence, however, they may be one or more programs. In the case of a plurality of programs, they are driven by the same computer or by separate computers.

[Operation of Charging Facility to Change Charging Schedule]

Figure 8:
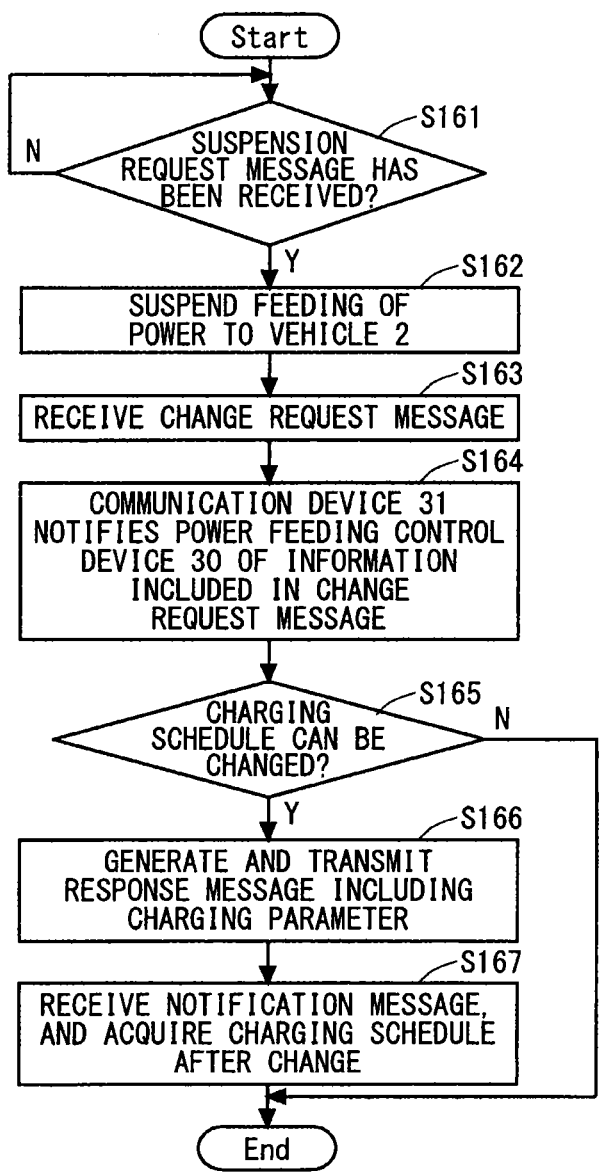
FIG. 8 is a flow chart showing operation of the charging facility according to Embodiment 1 to change the charging schedule.

Operation of the charging facility 3 is described herein with use of the flow chart of FIG. 8.

The communication device 31 judges whether the suspension request message requesting suspension of charging has been received for each predetermined cycle or at a given timing (step S161). If the suspension request message has been received, the communication device 31 notifies the power feeding control device 30 accordingly, and the power feeding control device 30 suspends feeding of power to the vehicle 2 (step S162). If the suspension request message has not been received, the communication device 31 returns to a state before step S161.

The communication device 31 receives the change request message requesting the change of the charging schedule (step S163). The communication device 31 reads information (e.g., desired charging power, desired charging completion time, and the current charging state of the battery 20) included in the change request message, and notifies the power feeding control device 30 of the read information (step S164).

The power feeding control device 30 judges, with reference to its own power feeding schedule, whether the charging schedule can be changed in accordance with the information included in the change request message (step S165). The power feeding schedule is stored, for example, in memory (not illustrated) and the like held by the charging facility 3.

Although the communication device 31 is described herein to read the information from the change request message, the power feeding control device 30 may read the information.

If the power feeding control device 30 judges that the charging schedule cannot be changed, the power feeding control device 30 notifies the information input and output device 32 and the information terminal 5 accordingly, and ends processing in the charging change sequence. With such configuration, the user can attempt to change the charging schedule again as necessary.

If the power feeding control device 30 judges that the charging schedule can be changed, the power feeding control device 30 notifies the communication device 31 of the charging parameter (e.g., the power rate per unit time, the charging start time, the estimated charging end time, and the amount of supplied power) applied in the case where the charging schedule is changed.

The charging parameter is calculated or determined by the charging facility 3 based on the information included in the change request message. For example, in a case where there is spare time in its own power feeding schedule, the charging facility 3 calculates, as the charging start time, time at which a time period (time period that the charging facility 3 requires to transmit the charging parameter and receive the charging schedule after the change) required for the charging schedule change sequence has elapsed since the spare time. The power rate per unit time is determined in accordance with a rate table (e.g., a table showing the relation between charging time and the power rate per unit time) held by the charging facility 3 in memory and the like.

For example, in a case where the charging facility 3 has surplus power, the power rate is set to be lower than usual. In contrast, in a case where the charging facility 3 receives power scheduled to be supplied to another vehicle 2, the power rate is set to be higher than usual.

The communication device 31 generates the response message including the charging parameter, and transmits the response message to the information terminal 5 (step S166). In a case where the vehicle 2 creates the charging schedule after the change, the communication device 31 also transmits the response message to the vehicle 2.

The communication device 31 receives the notification message including the new charging schedule after the change from the information terminal 5 or the vehicle 2 to acquire the charging schedule after the change (step S167). The communication device 31 then ends processing in the charging change sequence.

The power feeding control device 30 and the communication device 31 are described herein as separate devices. As in the charging start sequence, however, they may be one or more programs. In the case of a plurality of programs, they are driven by the same computer or by separate computers.

Charging End Sequence

A charging end sequence corresponds to steps S21 and S22 of FIG. 2.

(1) When the charging schedule ends, the vehicle 2 transmits an end notification message (step S21).

(2) When the charging facility 3 receives the end notification message, the charging facility 3 returns a response message to the vehicle 2, and performs processing to end the charging session (step S22).

(3) When the vehicle 2 receives the response message, the vehicle 2 ends the charging end sequence, and ends the charging session.

The vehicle 2 and the charging facility 3 preferably perform a maintenance and management sequence to check a connection state and an abnormal state of the charging cable during the charging session independently of each sequence.

According Embodiment 1, the charging system 1 generates the charging schedule after the change in response to the request for the change of the charging schedule based on the charging parameter of the charging facility 3 applied in the case where the charging schedule is changed and the information on the current charging state of the battery 20 corresponding to the charging schedule. As a result, the charging schedule can be changed without re-inserting the charging cable.

Since the charging system 1 can request the change of the charging schedule, it is possible to flexibly respond to a charging schedule that is different from a charging schedule transmitted when the charging cable is connected, for example, a charging schedule in which departure is performed during charging (before a scheduled charging end time) or departure time is delayed (the scheduled charging end time is delayed).

In a case where the charging schedule cannot be changed, the information terminal 5 or the vehicle 2 notifies the user accordingly. This allows the user to select whether to request the change of the charging schedule again, leading to improvement in user's convenience.

The charging facility 3 notifies the information terminal 5 or the vehicle 2 of the charging parameter applied after the change. As a result, in a case where surplus power or insufficient power has occurred, a schedule can flexibly be adjusted with the user, and thus power can effectively be used, and rate revenue can efficiently be ensured.

The vehicle 2 or the information terminal 5 includes the means for notifying, in a case where the charging parameter includes information that requires the approval of the user, the user of the information. As a result, information whose security has to be ensured, such as the information that requires the approval of the user, can be handled.

Embodiment 2

In Embodiment 1, the case where the information terminal 5 requests the change of the charging schedule is described. In Embodiment 2, a case where any event requiring the change of the charging schedule has occurred in a side of the charging facility 3 is described.

The configuration of the charging system 1 and operation other than the charging change sequence are the same as those in Embodiment 1, and thus description thereof is omitted. The following describes the charging change sequence according to Embodiment 2.

Charging Change Sequence

Figure 9:
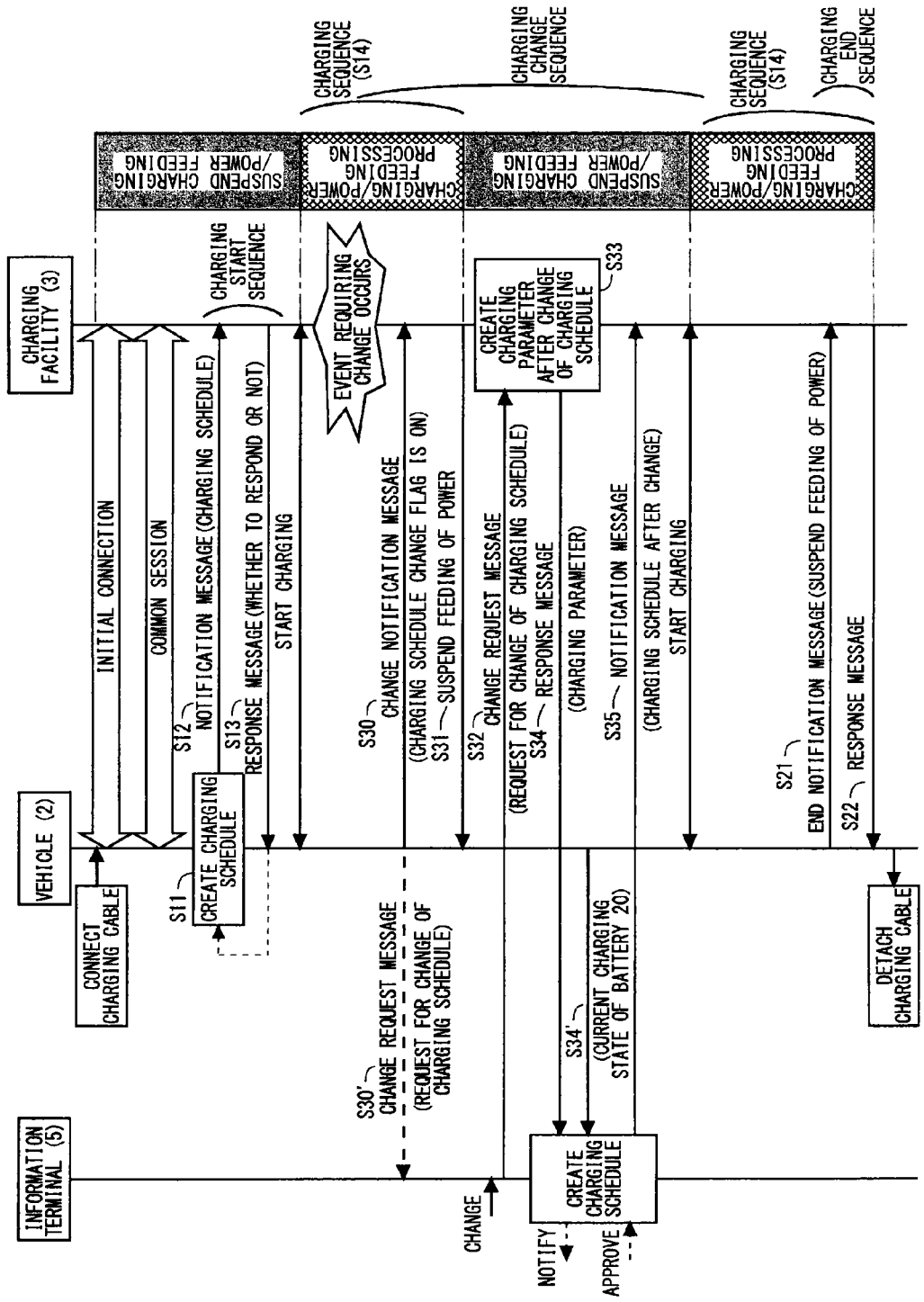
FIG. 9 shows a sequence in a charging system according to Embodiment 2.

The charging change sequence corresponds to steps S30 to S35 of FIG. 9.

(1) When any event requiring the change of the charging schedule has occurred in the charging facility 3 during charging processing, the charging facility 3 detects the occurrence of the event, generates a change notification message indicating the change of the charging schedule, and transmits the change notification message (step S30).

The event requiring the change of the charging schedule includes input of a request for the change from a user into the information input and output device 32, request from a power distribution side, power shortage, a change of a billing amount, fluctuation in $CO_2$ emissions, and request from another vehicle 2 connected to the charging facility 3 or an information terminal 5 controlling the other vehicle 2, for example.

(2) When the vehicle 2 receives the change notification message, the vehicle 2 notifies the information terminal 5 of the occurrence of the event requiring the change of the charging schedule as necessary (step S30'). In a case where the charging facility 3 also notifies the information terminal 5 of the occurrence of the event, the vehicle 2 does not have to notify the information terminal 5 of the occurrence of the event.

Since the vehicle 2 or the charging facility 3 notifies the information terminal 5 of the occurrence of the event, the information terminal 5 can notify the user of the occurrence of the event requiring the change of the charging schedule.

(3) After transmitting the change notification message, the charging facility 3 suspends feeding of power to the vehicle 2 (step S31).

(4) When the change of the charging schedule is input from the user into the information terminal 5, the information terminal 5 generates a change request message requesting the change of the charging schedule, and transmits the change request message (step S32).

(5) When the charging facility 3 receives the change request message, the charging facility 3 generates a charging parameter (e.g., a power rate per unit time and estimated charging completion time) applied in a case where the charging schedule is changed (step S33).

The charging parameter preferably satisfies a condition before the change of the charging schedule. In a case where the charging parameter does not satisfy the condition (e.g., a power rate per unit time, charging start time, estimated charging end time, and the amount of supplied power) before the change of the charging schedule, the charging parameter includes a flag (or code) for selection of whether to approve the change of the charging schedule.

(6) The charging facility 3 returns a response message including the charging parameter to the information terminal 5 (step S34). The vehicle 2 preferably includes information on the current charging state of the battery 20 in the response message, and notifies the information terminal 5 of the resultant response message.

The vehicle 2 may notify the information terminal 5 of the information on the current charging state of the battery 20 through communication performed separately between the information terminal 5 and the vehicle 2 (step S34').

(7) When the information terminal 5 receives the response message, the information terminal 5 acquires the charging parameter and the information on the current state of the battery 20, and creates the charging schedule after the change using the acquired charging parameter and information on the current state of the battery 20. The information terminal 5 generates notification message including the newly created charging schedule, and transmits the notification message to the charging facility 3 (step S35).

In this case, if approval of the user is required, the information terminal 5 notifies the user of the matter that requires the approval by displaying it on a screen or by using sounds, and receives input of the approval from the user. For example, the information terminal 5 calculates delay time of departure from the information on the charging parameter, converts the calculated delay time into text information, such as "The departure time will be delayed 30 minutes. You can depart at 10:30", and displays the text information on the screen.

(8) When the charging facility 3 receives the notification message, the charging facility 3 ends the charging change sequence.

In a case where the information terminal 5 having received the response message judges that the charging schedule cannot be changed (e.g., a case where a desired charging schedule cannot be created from the charging parameter after the change and a case where approval cannot be obtained from the user), the information terminal 5 preferably includes the information in the notification message, and transmits the resultant notification message to the charging facility 3.

Although the information terminal 5 is described herein to receive the response message, the vehicle 2 may receive the response message. In this case, the vehicle 2 includes information on the current charging state of the battery 20, and transmits the resultant response message to the information terminal 5. This eliminates the need for the information terminal 5 and the vehicle 2 to separately perform communication to transmit the information on the current charging state of the battery 20. This means that loads of communication processing on the information terminal 5 and the vehicle 2 are reduced, and thus power consumption can be reduced.

[Operation of Charging Facility to Change Charging Schedule]

Figure 10:
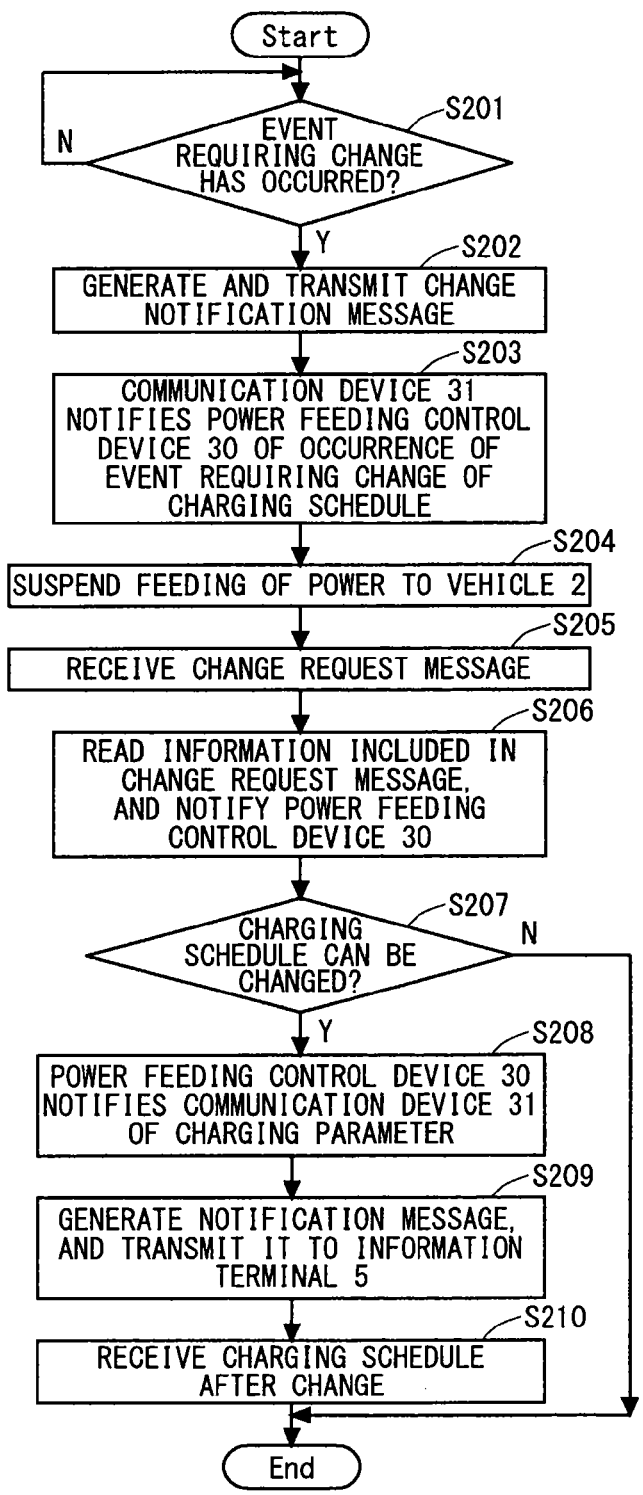
FIG. 10 is a flow chart showing operation of a charging facility according to Embodiment 2 to change a charging schedule.

Operation of the charging facility 3 is described herein with use of the flow chart of FIG. 10.

The charging facility 3 judges whether the event requiring the change of the charging schedule has occurred for each predetermined cycle or at a given timing (step S201). If the charging facility 3 judges that the event requiring the change of the charging schedule has not occurred, the charging facility 3 returns to a state before step S201.

On the other hand, if the charging facility 3 (1) detects input of the request for the change into the information input and output device 32 or (2) detects occurrence of the event requiring the change of the charging schedule from a component, which is not illustrated, of the side of the charging facility 3, for example, the communication device 31 generates the change notification message including a flag indicating that the charging schedule is changed, and transmits the change notification message to the vehicle 2 (step S202).

The communication device 31 also notifies the power feeding control device 30 of the occurrence of the event requiring the change of the charging schedule (step S203). When the power feeding control device 30 is notified of the occurrence of the event requiring the change of the charging schedule, the power feeding control device 30 suspends feeding of power to the vehicle 2 (step S204).

After step S204, the communication device 31 receives the change request message requesting the change of the charging schedule (step S205). The communication device 31 reads information (e.g., desired charging power and desired charging completion time) included in the change request message, and notifies the power feeding control device 30 of the read information (step S206).

The power feeding control device 30 judges, with reference to its own power feeding schedule, whether the charging schedule can be changed in accordance with the information included in the change request message (step S207). If the power feeding control device 30 judges that the charging schedule cannot be changed, the power feeding control device 30 ends the charging change sequence.

In this case, the power feeding control device 30 preferably notifies the information input and output device 32 or the information terminal 5 that the charging schedule cannot be changed. This allows the user to understand that the charging schedule cannot be changed.

Although the communication device 31 is described herein to read the information from the change request message, the power feeding control device 30 may read the information.

If the power feeding control device 30 judges that the charging schedule can be changed, the power feeding control device 30 notifies the communication device 31 of the charging parameter (e.g., the power rate per unit time, the charging start time, the estimated charging end time, and the amount of supplied power) applied in the case where the charging schedule is changed (step S208).

In this case, in a case where the charging facility 3 has surplus power, for example, the power rate is set to be lower than usual. In contrast, in a case where the charging facility 3 receives power scheduled to be supplied to another vehicle 2, the power rate is set to be higher than usual.

The communication device 31 generates the notification message including the charging parameter, and transmits the notification message to the information terminal 5 (step S209). The notification message can include, as a request for update of the charging schedule, information such as "Could you delay the departure time (estimated charging end time)?" and "Could you perform discharging of A watts from time B to time C?".

The communication device 31 also preferably transmits the notification message to the vehicle 2.

The communication device 31 receives the notification message from the information terminal 5 or the vehicle 2 to acquire the charging schedule after the change (step S210), and ends processing in the charging change sequence.

The power feeding control device 30 and the communication device 31 are described herein as separate devices. They, however, may be one or more programs. In the case of a plurality of programs, they are driven by the same computer or by separate computers.

[Operation of Vehicle to Change Charging Schedule]

Figure 11:
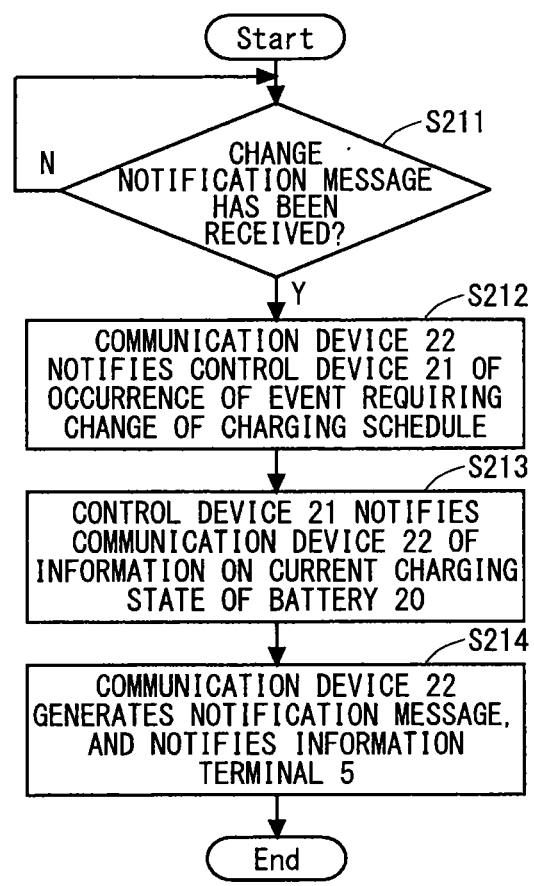
FIG. 11 is a flow chart showing operation of a vehicle according to Embodiment 2 to change the charging schedule.

Operation of the vehicle 2 is described herein with use of the flow chart of FIG. 11.

The communication device 22 judges whether the change notification message (or notification that notification of the change of the charging schedule has been made) has been received from the charging facility 3 or the information terminal 5 for each predetermined cycle or at a given timing (step S211). If the communication device 22 judges that the notification of the change has not been made, the communication device 22 returns to a state before step S211. On the other hand, if the communication device 22 judges that the notification of the change has been made, the communication device 22 notifies the control device 21 of the occurrence of the event requiring the change of the charging schedule (step S212).

The control device 21 notifies the communication device 22 of the information on the current charging state of the battery 20 (step S213). The communication device 22 generates the notification message including the information received from the control device 21. The communication device 22 transmits the notification message to the information terminal 5 (step S214), and ends processing in the charging change sequence.

The control device 21 and the communication device 22 are described herein as separate devices. They, however, may be a program. The program may further include one or more programs. In the case of a plurality of programs, they are driven by the same computer or by separate computers.

[Operation of Information Terminal to Change Charging Schedule]

Figure 12:
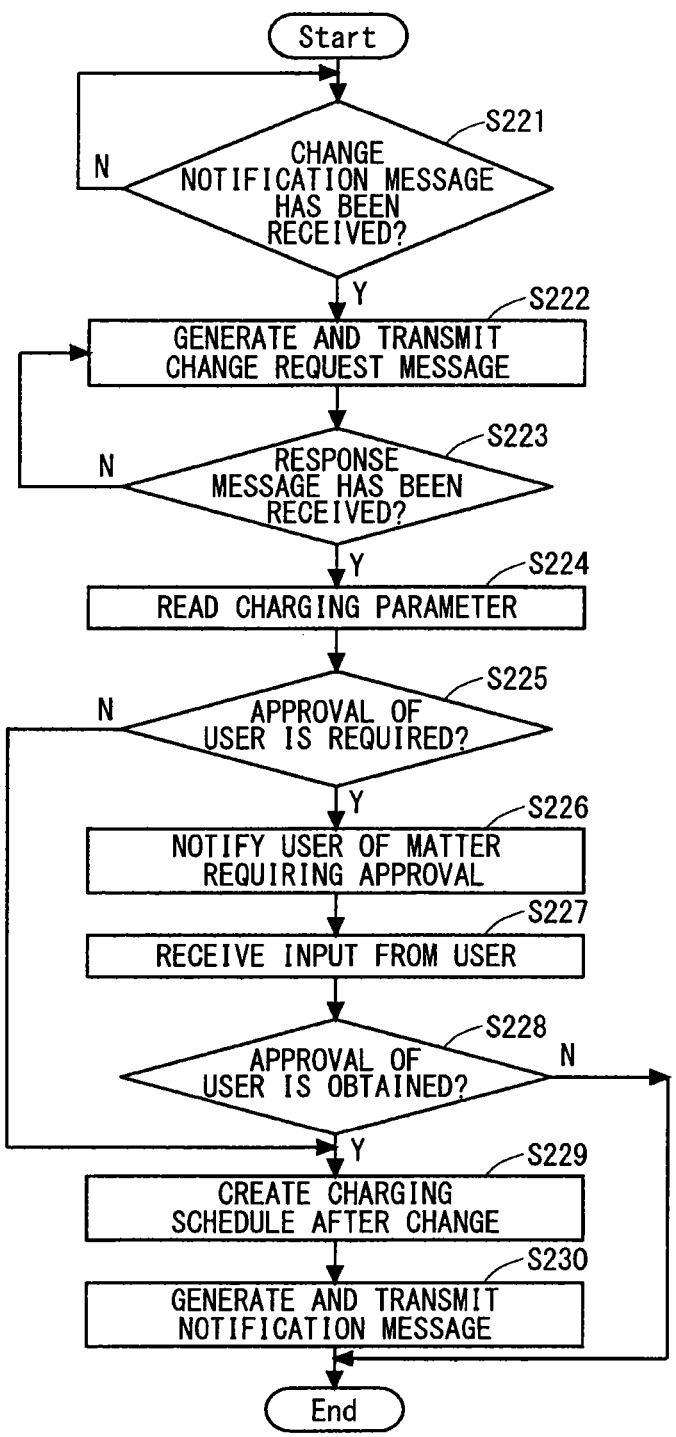
FIG. 12 is a flow chart showing operation of an information terminal according to Embodiment 2 to change the charging schedule.

Operation of the information terminal 5 is described herein with use of the flow chart of FIG. 12.

The information terminal 5 judges whether the change notification message indicating the change of the charging schedule has been received for each predetermined cycle or at a given timing (step S221). If the change notification message has not been received, the information terminal 5 returns to a state before step S221. On the other hand, if the information terminal 5 judges that the change notification message has been received, the information terminal 5 generates the change request message requesting the change of the charging schedule, and transmits the change request message to the vehicle 2 (step S222).

The information terminal 5 judges whether the response message including the new charging parameter applied in the case where the charging schedule is changed has been received from the charging facility 3 for each predetermined cycle or at a given timing (step S223).

If the response message has been received, the information terminal 5 reads the new charging parameter from the response message (step S224).

If the response message has not been received, the information terminal 5 preferably returns to step S222 to transmit the change request message to the charging facility 3 again. This improves reliability of the charging change sequence.

In a case where the number of times the change request message is transmitted exceeds a predetermined number, however, the information terminal 5 realizes that the charging facility 3 cannot respond to the change of the charging schedule, and ends processing in the charging change sequence. In this case, the information terminal 5 preferably notifies the user that the information terminal 5 judges that the charging schedule cannot be changed.

The information terminal 5 judges whether the charging parameter read in step S224 includes any matter that requires approval of the user (step S225). If the information terminal 5 judges that the matter that requires the approval of the user is included, the information terminal 5 notifies the user of the matter that requires the approval of the user (step S226).

The information terminal 5 receives input from the user (step S227), and judges whether the approval can be obtained (step S228). If the approval of the user can be obtained, processing proceeds to next step S229. On the other hand, if the approval of the user cannot be obtained within a predetermined time period, the information terminal 5 judges that the charging schedule cannot be changed, and ends the charging change flow. In this case, the information terminal 5 preferably notifies the user that the information terminal 5 judges that the charging schedule cannot be changed.

If the matter that requires the approval of the user is not included in step S225, and if the approval of the user can be obtained in step S228, the information terminal 5 creates the charging schedule after the change based on the read charging parameter (step S229). The information terminal 5 generates the notification message including information on the created charging schedule, and transmits the notification message to the charging facility 3 (step S230). The information terminal 5 also preferably transmits the notification message to the vehicle 2.

In a case where another event requiring the change of the charging schedule has occurred during the charging change sequence, the information terminal 5 returns to step S221 to repeat operation in and after step S221. In a case where the request for the change of the charging schedule is input from the user, the information terminal 5 returns to step S227 to repeat operation in and after step S227.

The case where the information terminal 5 creates the change request message requesting the change of the charging schedule is described herein. In a case where the user inputs the charging parameter into the information input and output device 32 of the charging facility 3, however, the charging facility 3 may create the charging schedule after the change.

In this case, the information input and output device 32 notifies the power feeding control device 30 of the charging parameter. The communication device 31 acquires the information on the current charging state of the battery 20 through the charging cable 4, and notifies the power feeding control device 30 of the information on the current charging state of the battery 20. The power feeding control device 30 creates the charging schedule after the change based on the charging parameter received from the information input and output device 32 and the information on the current charging state of the battery 20.

The case where feeding of power to the vehicle 2 is suspended immediately if any event requiring the change of the charging schedule has occurred is described herein. Feeding of power to the vehicle 2, however, may be suspended in accordance with the details of the change request message received from the information terminal 5. Specifically, in a case where the change request message includes a flag (or code) that requests an original charging schedule, the charging facility 3 performs charging of the vehicle 2 corresponding to the information terminal 5 in accordance with the original charging schedule.

According to Embodiment 2, the following effects are produced in addition to the effects produced in Embodiment 1.

The charging facility 3 notifies the information terminal 5 of the occurrence of the event requiring the change of the charging schedule. As a result, the charging system 1 can change the charging schedule in response to the input of the request for the change of the charging schedule into the charging facility 3 and the occurrence of the event requiring the change of the charging schedule in a power network in the side of the charging facility 3.

Since the charging facility 3 includes the information input and output device 32 through which the user inputs and outputs information on the charging schedule, the charging schedule can be changed without performing complicated communication between the information terminal 5 and the charging facility 3.

Furthermore, since the charging facility 3 judges whether to suspend feeding of power to the vehicle 2 in accordance with the details of the change request message received from the information terminal 5, charging of the vehicle 2 can be completed by reserved time. This improves reliability of the charging system 1.

Embodiment 3

In Embodiments 1 and 2, the case where the charging facility 3 creates the charging parameter necessary for the charging schedule is described. In Embodiment 3, a case where a supply-demand planning server that is different from the charging facility 3 creates the charging parameter is described.

<Configuration of Charging System>

Figure 13:
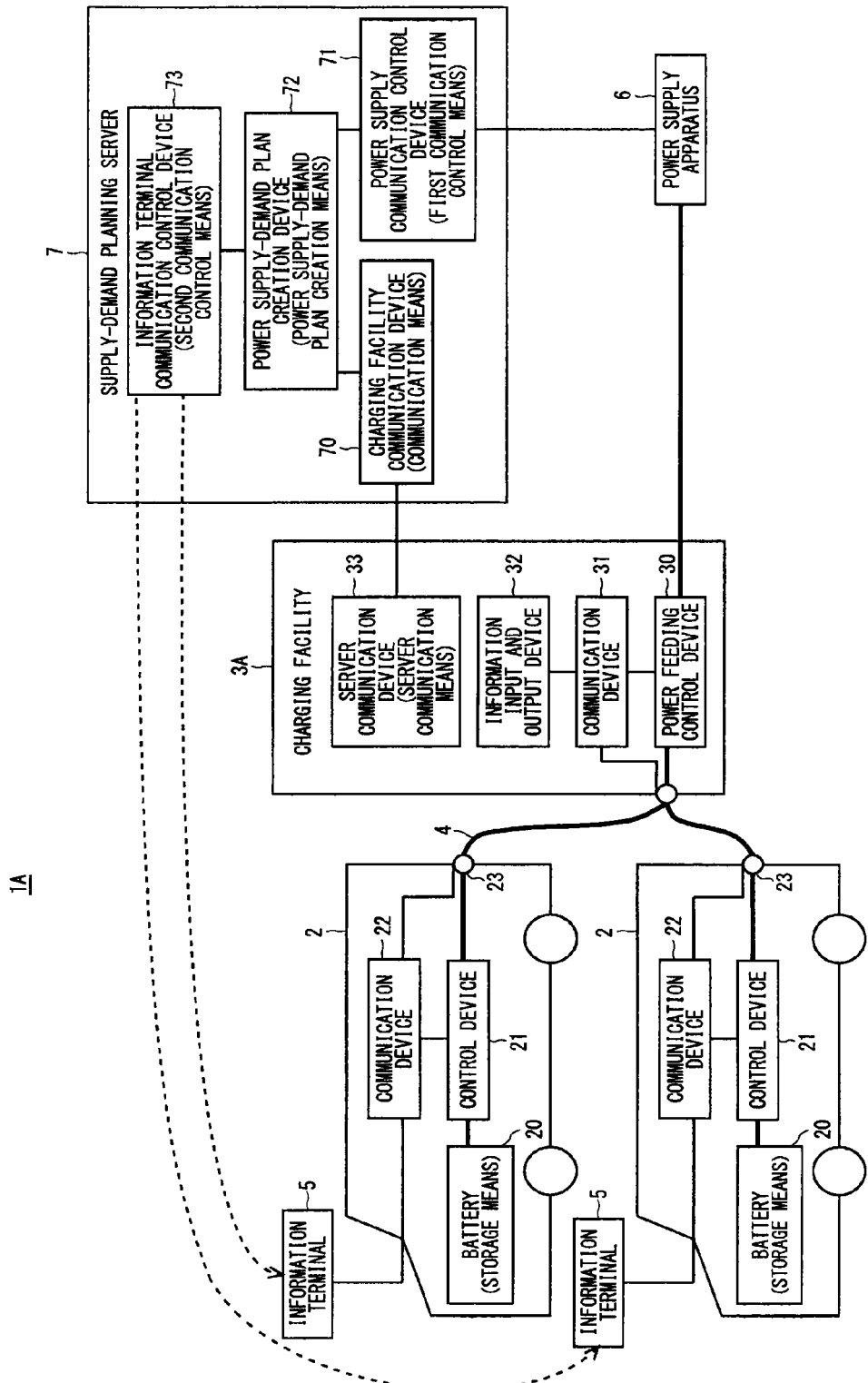
FIG. 13 is a schematic diagram of a charging system according to Embodiment 3.

A charging system 1A in Embodiment 3 is illustrated in FIG. 13. The charging system 1A includes a power supply apparatus 6 and a supply-demand planning server (server) 7 in addition to components of the charging system 1 in Embodiment 1. Furthermore, the charging system 1A includes a charging facility 3A in place of the charging facility 3 in Embodiment 1. The number of vehicles 2 included in the charging system 1A is not limited to two, and may be one, or may be three or more.

The following describes the configuration of the supply-demand planning server 7 and the configuration of the charging facility 3A.

(Configuration of Supply-demand Planning Server)

An example of the supply-demand planning server 7 is a computer installed in a power distribution company or an electric utility company.

The supply-demand planning server 7 includes a charging facility communication device (communication means) 70, a power supply communication control device (first communication control means) 71, a power supply-demand plan creation device (power supply-demand plan creation means) 72, and an information terminal communication control device (second communication control means) 73.

The charging facility communication device 70 is connected to the charging facility 3A through a wireless or wired communication channel to communicate with the charging facility 3A. The power supply communication control device 71 is connected to the power supply apparatus 6 through a wireless or wired communication channel to communicate with the power supply apparatus 6 and to control the power supply apparatus 6. The power supply-demand plan creation device 72 creates a plan for power supply and demand based on information acquired from the charging facility 3A and the information terminal 5. The information terminal communication control device 73 is connected to the information terminal 5 through a wireless or wired communication channel (e.g., a public communication channel such as the Internet) to communicate with the information terminal 5.

(Configuration of Charging Facility)

The charging facility 3A includes a server communication device (communication means) 33 in addition to components of the charging facility 3 in Embodiment 1.

Examples of the charging facility 3A are a charging station installed by the verge of a road and a meter installed at home.

In a case where the charging facility 3A is the charging station, the charging cable 4 is included in the charging facility 3A as a part of the charging station.

In a case where the charging facility 3A is the meter, the charging cable 4 may be a part of the vehicle 2. In this case, an end of the charging cable 4 is preferably a power supply plug that can be connected to an outlet.

<Operation of Charging System>

Operation of the charging system 1A is described herein.

Basic operation is the same as that in Embodiments 1 and 2, and thus description thereof is omitted. However, the operation differs from that in Embodiments 1 and 2 in that some functions of the charging facility 3A are performed by the supply-demand planning server 7. For example, communication such as initial connection and a common session is performed between the vehicle 2 and the supply-demand planning server 7.

The charging change sequence is described herein in details.

Charging Change Sequence

Figure 14:
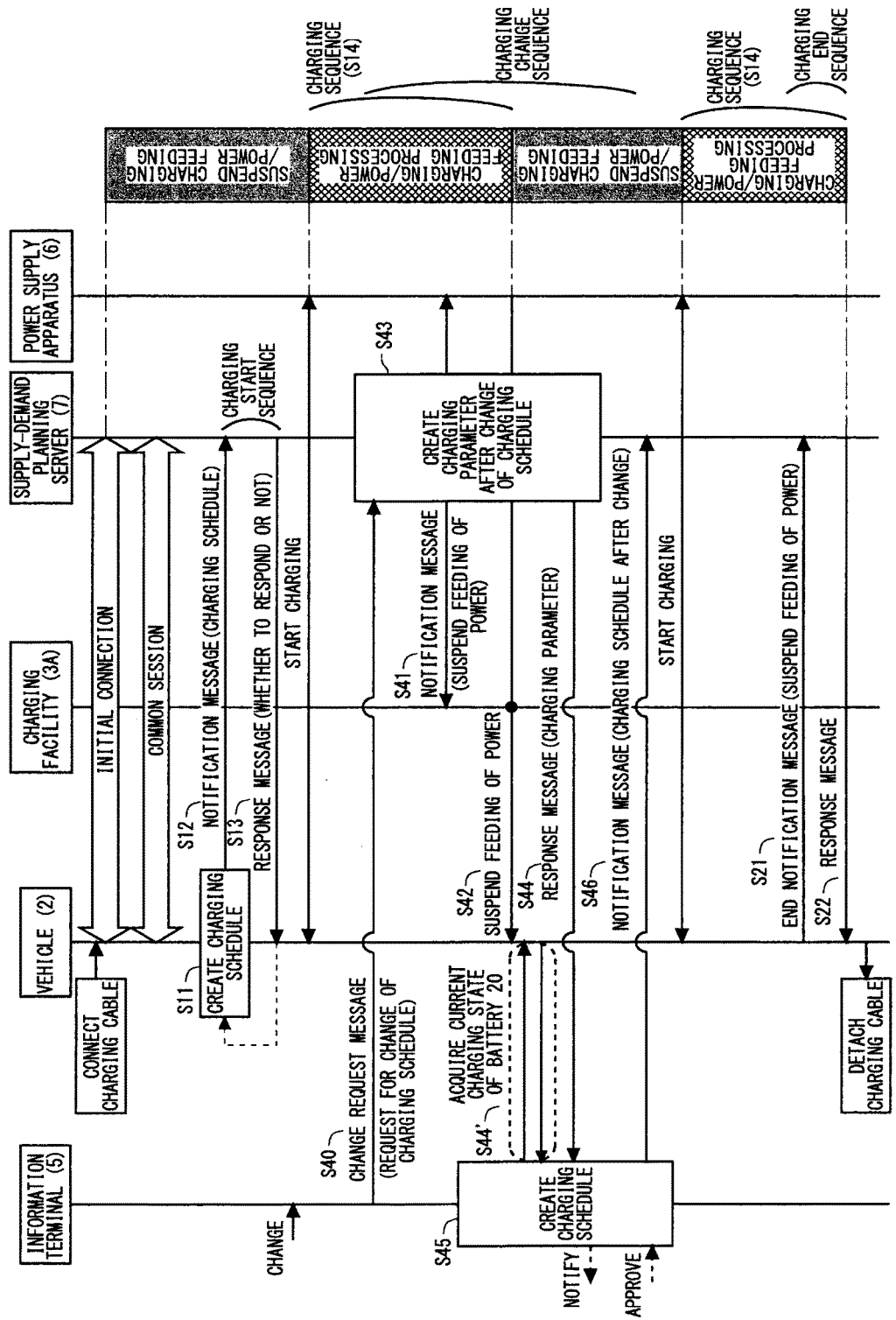
FIG. 14 shows a sequence in the charging system according to Embodiment 3.

The charging change sequence corresponds to steps S40 to S46 of FIG. 14.

(1) When a change of the charging schedule is input from a user into the information terminal 5, the information terminal 5 generates a change request message requesting the change of the charging schedule, and transmits the change request message to the vehicle 2 and the supply-demand planning server 7 (step S40). The change request message may be transmitted from the information terminal 5 directly to the supply-demand planning server 7, or may be transmitted from the information terminal 5 to the supply-demand planning server 7 via the vehicle 2.

(2) When the supply-demand planning server 7 receives the change request message, the supply-demand planning server 7 transmits a notification message (first notification message) to suspend feeding of power to the vehicle 2 to the charging facility 3A and the power supply apparatus 6 (step S41).

(3) When the charging facility 3A and the power supply apparatus 6 receive the notification message from the supply-demand planning server 7, the charging facility 3A and the power supply apparatus 6 suspend feeding of power to the vehicle 2 (step S42).

(4) When the supply-demand planning server 7 receives the change request message, the supply-demand planning server 7 generates a charging parameter (e.g., a power rate and estimated charging completion time) applied in a case where the charging schedule is changed (step S43).

The charging parameter preferably satisfies a condition before the change of the charging schedule. In a case where the charging parameter does not satisfy the condition (e.g., a power rate per unit time, charging start time, estimated charging end time, and the amount of supplied power) before the change of the charging schedule, the charging parameter includes a flag (or code) for selection of whether to approve the change of the charging schedule.

(5) The supply-demand planning server 7 generates a response message including the newly generated charging parameter, and transmits the response message to the information terminal 5 (step S44). The vehicle 2 separately notifies the information terminal 5 of information on the current state of the battery 20 (step S44').

(6) When the information terminal 5 receives the response message from the vehicle 2 and the supply-demand planning server 7, the information terminal 5 creates the charging schedule after the change using the charging parameter and the information on the current state of the battery 20 (step S45).

(7) The information terminal 5 generates a notification message (second notification message) including the charging schedule after the change, and transmits the notification message to the supply-demand planning server 7 (step S46).

(8) When the supply-demand planning server 7 receives the notification message from the information terminal 5, the supply-demand planning server 7 ends the charging change sequence.

The order of steps S41, S43, and S44' described above is not limited to this order, and may be changed to any order.

In a case where the information terminal 5 having received the response message judges that the charging schedule cannot be changed (e.g., a case where a desired charging schedule cannot be created from the charging parameter after the change and a case where approval cannot be obtained from the user), the information terminal 5 preferably includes the information in the notification message, and transmits the resultant notification message to the supply-demand planning server 7.

The information terminal 5 is described herein to notify the supply-demand planning server 7 of the charging schedule after the change. The information terminal 5, however, may notify the vehicle 2 or the charging facility 3A of the charging schedule after the change, and the vehicle 2 or the charging facility 3A having received the notification may notify the supply-demand planning server 7.

By including the vehicle 2 and the charging facility 3A in the communication channel, confidentiality of the charging schedule after the change can be maintained even if notification is made using a simple communication protocol.

As described in Embodiment 1, the charging schedule after the change may be created not by the information terminal 5 but by the vehicle 2. For example, in a case where the approval of the user is not required, the vehicle 2 does not have to transmit the information on the current charging state of the battery 20 to the information terminal 5, and thus communication loads on the vehicle 2 and the information terminal 5 can be reduced.

In this case, the charging schedule after the change is transmitted from the vehicle 2 to the charging facility 3A through the charging cable 4. If the charging facility 3A judges, with reference to its own power feeding schedule, that the charging facility 3A can feed power in accordance with the charging schedule after the change, the charging facility 3A notifies the supply-demand planning server 7 of the charging schedule after the change. On the other hand, if the charging facility 3A judges that the charging facility 3A cannot feed power in accordance with the charging schedule after the change, the charging facility 3A notifies the user accordingly without transferring the charging schedule after the change to the supply-demand planning server 7. With such configuration, the communication loads on the charging facility 3A and the supply-demand planning server 7 can be reduced.

[Operation of Supply-Demand Planning Server to Change Charging Schedule]

Figure 15:
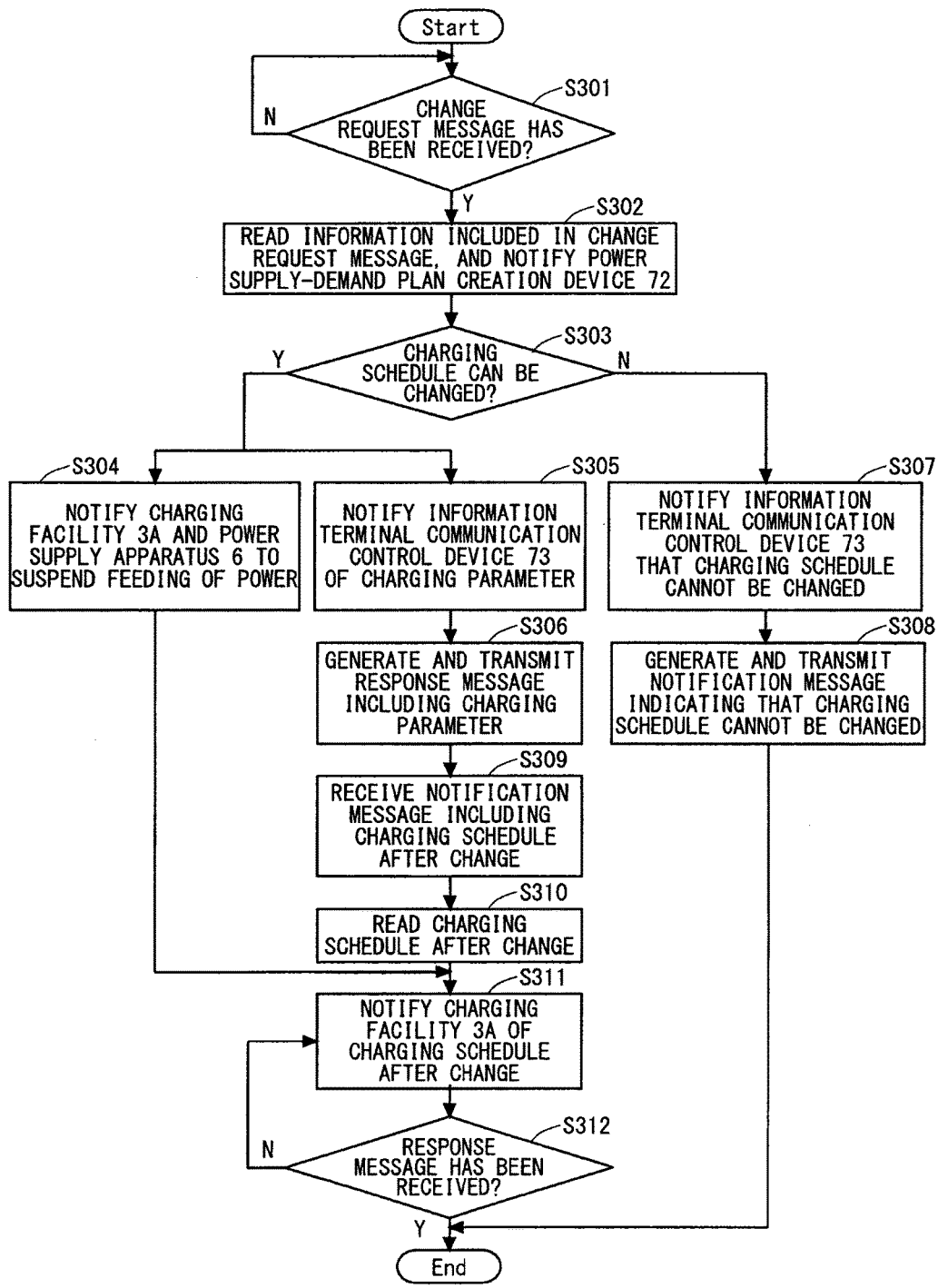
FIG. 15 is a flow chart showing operation of a supply-demand planning server according to Embodiment 3 to change a charging schedule.

Operation of the supply-demand planning server 7 is described herein with use of the flow chart of FIG. 15.

The information terminal communication control device 73 judges whether the change request message has been received for each predetermined cycle or at a given timing (step S301). If the change request message has not been received, the information terminal communication control device 73 returns to a state before step S301. If the change request message has been received, the information terminal communication control device 73 reads information (e.g., desired charging power, desired charging completion time, and the current charging state of the battery 20) included in the change request message, and notifies the power supply-demand plan creation device 72 of the read information (step S302).

The power supply-demand plan creation device 72 judges, with reference to the power feeding schedule of the charging facility 3A, whether the charging schedule can be changed in accordance with the information included in the change request message (step S303). The power feeding schedule of the charging facility 3A is stored, for example, in memory (not illustrated) and the like held by the supply-demand planning server 7.

Although the information terminal communication control device 73 is described herein to read the information from the change request message, the power supply-demand plan creation device 72 may read the information.

If the power supply-demand plan creation device 72 judges that the charging schedule can be changed, the power supply-demand plan creation device 72 transmits a notification (or an instruction) signal to suspend feeding of power to the vehicle 2 to the charging facility 3A via the charging facility communication device 70 and to the power supply apparatus 6 via the power supply communication control device 71 (step S304).

Furthermore, if the power supply-demand plan creation device 72 judges that the charging schedule can be changed, the power supply-demand plan creation device 72 notifies the information terminal communication control device 73 of the charging parameter (e.g., the power rate per unit time, the charging start time, the estimated charging end time, and the amount of supplied power) applied in the case where the charging schedule is changed (step S305).

The charging parameter is calculated or determined by the supply-demand planning server 7 based on the information included in the change request message. For example, in a case where there is spare time in the power feeding schedule of the charging facility 3A (charging facility corresponding to the vehicle 2 of the user who has transmitted the change request message), the supply-demand planning server 7 calculates, as the charging start time, time at which a time period (time period that the supply-demand planning server 7 requires to transmit the charging parameter and receive the charging schedule after the change) required for the charging schedule change sequence has elapsed since the spare time. The power rate per unit time is determined in accordance with a, rate table (e.g., a table showing the relation between charging time and the power rate per unit time) held by the supply-demand planning server 7 in memory and the like.

For example, in a case where the charging facility 3A has surplus power, the power rate is set to be lower than usual. In contrast, in a case where the charging facility 3A receives power scheduled to be supplied to another vehicle 2 and the like, the power rate is set to be higher than usual.

The information terminal communication control device 73 generates the response message including the charging parameter, and transmits the response message to the information terminal 5 (step S306). The information terminal communication control device 73 preferably includes, in the response message, a flag (or code) indicating that the charging schedule is changed.

On the other hand, if the power supply-demand plan creation device 72 judges that the charging schedule cannot be changed, the power supply-demand plan creation device 72 notifies the information terminal communication control device 73 accordingly (step S307). The information terminal communication control device 73 generates the response message including a flag indicating that the charging schedule cannot be changed, and transmits the response message to the information terminal 5 (step S308).

After step S306, the information terminal communication control device 73 receives the notification message including the charging schedule after the change (step S309). The information terminal communication control device 73 reads the charging schedule after the change, and notifies the power supply-demand plan creation device 72 of the read charging schedule (step S310).

The power supply-demand plan creation device 72 notifies the charging facility communication device 70 of the charging schedule after the change. The charging facility communication device 70 generates a notification message including the charging schedule after the change, and transmits the notification message to the charging facility 3A (step S311).

The charging facility communication device 70 judges whether a response message has been received from the charging facility 3A (step S312). If the response message has not been received within a predetermined time period, the charging facility communication device 70 returns to step S311 to transmit the notification message again. If the response message has been received, the charging facility communication device 70 ends processing in the charging change sequence.

Communication between the supply-demand planning server 7 and the information terminal 5 may be performed via the charging facility 3A and the vehicle 2. In this case, the power supply-demand plan creation device 72 notifies not the information terminal communication control device 73 but the charging facility communication device 70 of the charging parameter, and the charging facility communication device 70 receives the charging schedule after the change.

In this case, the charging facility 3A acquires the information on the charging schedule after the change when the charging facility communication device 70 receives the notification message including the new charging schedule in step S310. The power supply-demand plan creation device 72 thus ends processing in the charging change sequence after step S309 without notifying the charging facility 3A of the charging schedule after the change.

Regardless of the communication path between the information terminal 5 and the supply-demand planning server 7, the power supply-demand plan creation device 72 notifies the power supply communication control device 71 of the charging schedule after the change. The power supply communication control device 71 transmits a control signal to control power supply to the power supply apparatus 6 in response to the charging schedule after the change.

Meanwhile, the supply-demand planning server 7 can perform processing to change the charging schedule in response to the request for the change not from the information terminal communication control device 73 but from the charging facility communication device 70.

For example, the charging facility communication device 70 judges whether the change request message has been received from the charging facility 3A for each predetermined cycle or at a given timing. In a case where the change request message has been received, the charging facility communication device 70 reads information (e.g., desired charging power, desired charging completion time, and the current charging state of the battery 20) included in the change request message, and notifies the power supply-demand plan creation device 72 of the read information.

The power supply-demand plan creation device 72 judges, with reference to its own power feeding schedule, whether the charging schedule can be changed in accordance with the information included in the change request message. Subsequent operation is the same as that in and after step S304 of FIG. 15, and thus description thereof is omitted.

Although the charging facility communication device 70 is described herein to read the information from the change request message, the power supply-demand plan creation device 72 may read the information.

The charging facility communication device 70, the power supply communication control device 71, the power supply-demand plan creation device 72, and the information terminal communication control device 73 are described herein as separate devices. They, however, may be a program. The program may further include one or more programs. In the case of a plurality of programs, they are driven by the same computer or by separate computers.

[Operation of Charging Facility to Change Charging Schedule]

Figure 16:
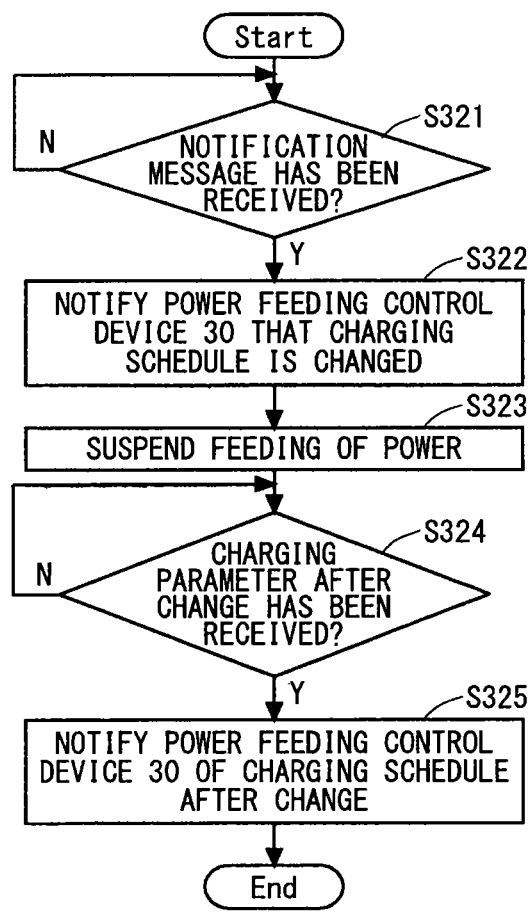
FIG. 16 is a flow chart showing operation of a charging facility according to Embodiment 3 to change the charging schedule.

Operation of the charging facility 3A is described herein with use of the flow chart of FIG. 16.

The server communication device 33 judges whether the notification message to suspend feeding of power and the notification message indicating the charging parameter have been received from the supply-demand planning server 7 for each predetermined cycle or at a given timing (step S321). If the notification messages have not been received, the server communication device 33 returns to a state before step S321.

If the notification messages have been received, the server communication device 33 notifies the power feeding control device 30 that the charging schedule is changed (step S322). The power feeding control device 30 suspends feeding of power to the vehicle 2 (step S323).

The server communication device 33 (or communication device 31) judges whether the notification message including the charging schedule after the change has been received for each predetermined cycle or at a given timing (step S324). If the notification message has not been received, the server communication device 33 (or communication device 31) returns to a state before step S324.

If the server communication device 33 (or communication device 31) judges that the notification message including the charging schedule after the change has been received, the server communication device 33 (or communication device 31) notifies the power feeding control device 30 of the notification message including the charging schedule after the change (step S325), and ends processing in the charging change sequence.

In a case where a notification path along which the notification message including the charging schedule after the change is transmitted is determined in advance, only one of the server communication device 33 and the communication device 31 that corresponds to the notification path performs processing in steps S324 and S325.

The charging start sequence resumes after the charging change sequence. In the charging start sequence, the power feeding control device 30 feeds power supplied from the power supply apparatus 6 to the vehicle 2 based on the charging schedule after the change.

The control device 21 and the communication device 22 are described herein as separate devices. They, however, may be a program. The program may further include one or more programs. In the case of a plurality of programs, they are driven by the same computer or by separate computers.

Although the second communication scheme is described herein as OFDM, OFDM may be replaced with wired communication such as a controller area network (CAN) or wireless communication such as Wi-Fi, for example.

[Operation of Vehicle to Change Charging Schedule]

Operation of the vehicle 2 is obtained by eliminating some steps from the operation in Embodiment 2 (FIG. 11), and thus description thereof is omitted.

[Operation of Information Terminal to Change Charging Schedule]

Operation of the information terminal 5 is described herein with use of the flow chart of FIG. 17.

The information terminal 5 judges whether the change of the charging schedule has been input from the user for each predetermined cycle or at a given timing (step S331). If the information terminal judges that the change has not been input, the information terminal returns to a state before step S331. If the information terminal 5 judges that the change of the charging schedule has been input, the information terminal 5 generates the change request message requesting the change of the charging schedule (step S332). The information terminal 5 transmits the generated change request message to the supply-demand planning server 7 (step S333).

The information terminal 5 judges whether the response message has been received from the supply-demand planning server 7 for each predetermined cycle or at a given timing (step S334). If the information terminal 5 has not received the response message, the information terminal 5 returns to a state before step S333.

In a case where the number of times the change request message is transmitted exceeds a predetermined number, however, the information terminal 5 realizes that the charging facility 3A connected to the vehicle 2 cannot respond to the change of the charging schedule, and ends processing in the charging change sequence. In this case, the information terminal 5 preferably notifies the user that the information terminal 5 judges that the charging schedule cannot be changed.

If the information terminal 5 judges that the response message has been received, the information terminal 5 judges whether the received response message is the response message including the charging parameter or the response message indicating that the charging schedule cannot be changed (step S335). If the information terminal 5 judges that the received response message is the notification message indicating that the charging schedule cannot be changed, the information terminal 5 realizes that the charging facility 3A connected to the vehicle 2 cannot respond to the change of the charging schedule, and ends processing in the charging change sequence. In this case, the information terminal 5 also preferably notifies the user that the information terminal 5 judges that the charging schedule cannot be changed.

If the information terminal 5 judges that the received response message is the notification message including the charging parameter, the information terminal 5 reads the charging parameter, and judges whether the read charging parameter includes any matter that requires approval of the user (step S336). If the information terminal 5 judges that the matter that requires the approval of the user is included, the information terminal 5 notifies the user of the matter that requires the approval of the user (step S337). In this case, the information terminal 5 preferably converts information on the charging parameter into delay time of departure for notification.

The information terminal 5 waits a predetermined time period, and judges whether the approval is input from the user (step S338). If the approval of the user is input, processing proceeds to next step S339. On the other hand, if the approval of the user is not input within the predetermined time period, the information terminal 5 judges that the charging schedule cannot be changed, and ends processing in the charging change sequence. In this case, the information terminal 5 preferably notifies the user that the information terminal 5 judges that the charging schedule cannot be changed.

If the matter that requires the approval of the user is not included in step S336, and if the approval of the user can be obtained in step S338, the information terminal 5 creates the charging schedule after the change using the read charging parameter and the information on the current state of the battery 20 (step S339).

The information terminal 5 separately acquires the information on the current state of the battery 20 from the vehicle 2 by a method as described in Embodiments 1 and 2.

The information terminal 5 generates the notification message including the information on the newly created charging schedule after the change (step S340). The information terminal 5 transmits the charging schedule after the change to the supply-demand planning server 7 (step S341), and ends processing in the charging change sequence.

The information terminal 5 may transmit the charging schedule after the change to the charging facility 3A via the vehicle 2.

[Operation of Power Supply Apparatus to Change Charging Schedule]

Operation of the power supply apparatus 6 is described herein.

After the charging change sequence, the power supply apparatus 6 receives the control signal corresponding to the charging schedule after the change from the supply-demand planning server 7. The power supply apparatus 6 supplies power to the charging facility 3A based on the control signal.

According to Embodiment 3, the following effects are produced in addition to the effects produced in Embodiment 1.

Since the supply-demand planning server 7 is included, the configuration of the charging facility 3A can be simplified.

Since the supply-demand planning server 7 collectively manages charging schedules of a plurality of charging facilities 3A, an installation cost and an operation cost of the charging system as a whole can be reduced.

The information terminal 5 transmits the request for the change to the supply-demand planning server 7 through the public communication channel. Secure communications can thus be performed using the existing communication protocol in which security is ensured.

Embodiment 4

In Embodiment 3, the case where the information terminal 5 requests the supply-demand planning server 7 to change the charging schedule is described. In Embodiment 4, a case where any event requiring the change of the charging schedule has occurred in a side of the supply-demand planning server 7 is described.

The configuration of the charging system 1A and operation other than the charging change sequence are the same as those in Embodiment 3, and thus description thereof is omitted. The following describes the charging change sequence according to the present embodiment.

Charging Change Sequence

Figure 18:
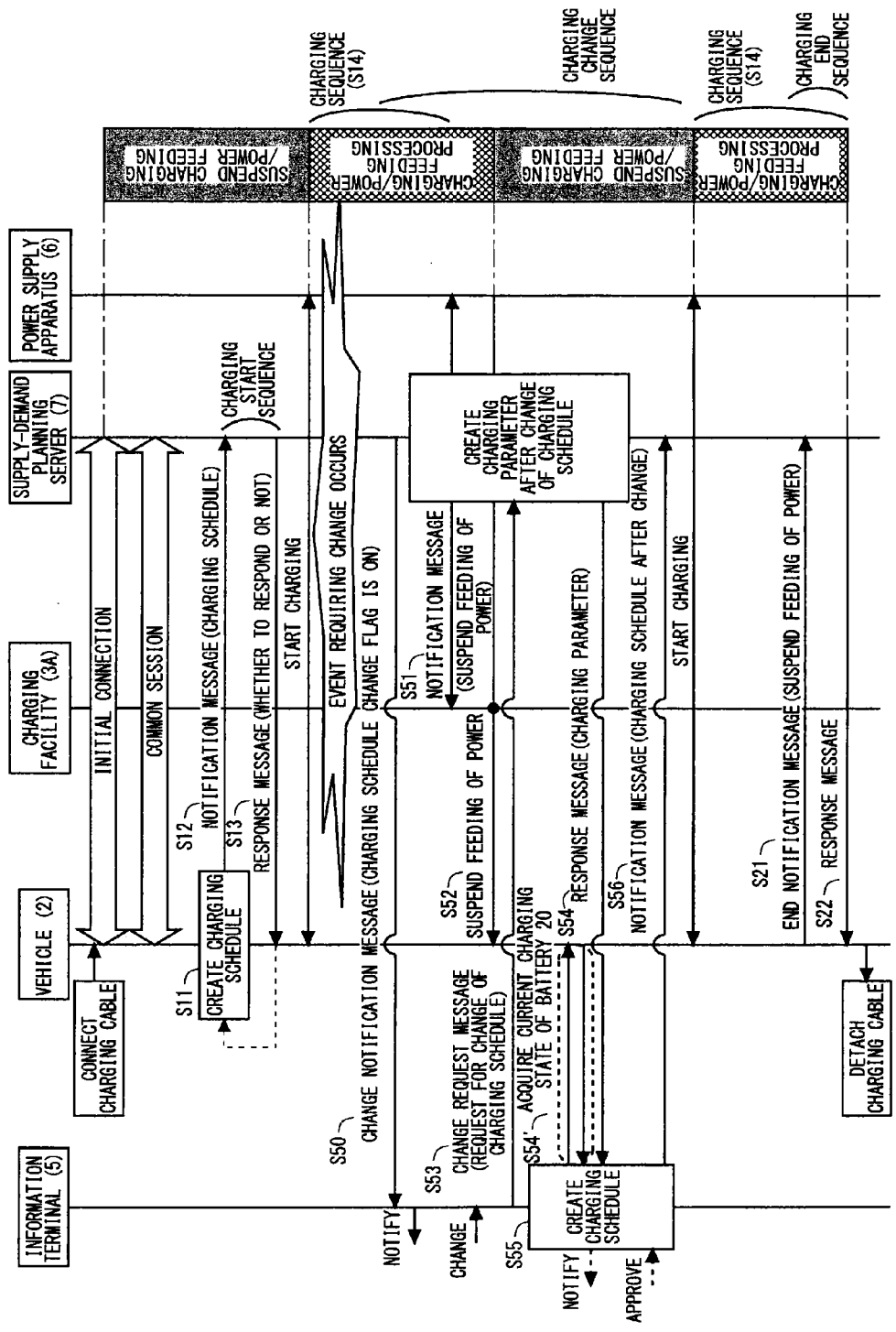
FIG. 18 shows a sequence in a charging system according to Embodiment 4.

The charging change sequence corresponds to steps S50 to S56 of FIG. 18.

(1) When any event requiring the change of the charging schedule has occurred in the side of the supply-demand planning server 7 (at least one of the charging facility 3A, the power supply apparatus 6, and the supply-demand planning server 7) during charging processing, the supply-demand planning server 7 detects the occurrence of the event, generates a change notification message indicating the change of the charging schedule, and transmits the change notification message to the information terminal 5 (step S50). When the information terminal 5 receives the change notification message, the information terminal 5 notifies a user of the occurrence of the event requiring the change of the charging schedule.

The event requiring the change of the charging schedule includes input of a request for the change from the user into the information input and output device 32 of the charging facility 3A and a change of the state of the power supply apparatus 6 or a power network that requires the change of the charging schedule (e.g., request from a power distribution side, power shortage, a change of a billing amount, fluctuation in $CO_2$ emissions, and request from another vehicle 2 connected to the charging facility 3A or the information terminal 5 controlling the other vehicle 2), for example.

(2) After transmitting the change notification message, the supply-demand planning server 7 notifies the charging facility 3A and the power supply apparatus 6 to suspend feeding of power to the vehicle 2 (step S51).

(3) When the charging facility 3A and the power supply apparatus 6 receive the notification from the supply-demand planning server 7, the charging facility 3A and the power supply apparatus 6 suspend feeding of power to the vehicle 2 (step S52).

(4) When the change of the charging schedule is input from the user into the information terminal 5, the information terminal 5 generates a change request message requesting the change of the charging schedule, and transmits the change request message to the supply-demand planning server 7 (step S53).

(5) When the supply-demand planning server 7 receives the change request message, the supply-demand planning server 7 generates a charging parameter (e.g., a power rate and estimated charging completion time) applied in a case where the charging schedule is changed, and returns a response message including the charging parameter to the information terminal 5 (step S54). The vehicle 2 separately performs communication with the information terminal 5 to notify the information terminal 5 of information on the current state of the battery 20 (step S54').

The charging parameter included in the response message preferably satisfies a condition (e.g., a power rate per unit time, charging start time, estimated charging end time, and the amount of supplied power) before the change of the charging schedule. In a case where the charging parameter included in the response message does not satisfy the condition before the change of the charging schedule, the charging parameter includes a flag (or code) for selection of whether to approve the change of the charging schedule.

(6) When the information terminal 5 receives the response message from the supply-demand planning server 7, the information terminal 5 creates the charging schedule after the change using the charging parameter and the information on the current state of the battery 20 (step S55).

In this case, if approval of the user is required, the information terminal 5 notifies the user of the matter that requires the approval by displaying it on a screen or by using sounds, and receives input of the approval from the user. The information terminal 5 preferably converts information on the charging parameter into delay time of departure for notification.

(7) The information terminal 5 generates a notification message including the charging schedule after the change, and transmits the notification message to the supply-demand planning server 7 (step S56).

(8) When the supply-demand planning server 7 receives the notification message, the supply-demand planning server 7 ends the charging change sequence.

The order of steps S50 and S51 described above may be reversed.

In a case where the information terminal 5 having received the response message judges that the charging schedule cannot be changed (e.g., a case where a desired charging schedule cannot be created from the charging parameter after the change and a case where approval cannot be obtained from the user), the information terminal 5 preferably includes the information in the notification message, and transmits the resultant notification message to the supply-demand planning server 7.

Although the information terminal 5 is described herein to receive the response message, the vehicle 2 may receive the response message. In this case, the vehicle 2 includes the information on the current charging state of the battery 20, and transmits the resultant response message to the information terminal 5. This eliminates the need for the information terminal 5 and the vehicle 2 to separately perform communication to transmit the information on the current charging state of the battery 20.

The information terminal 5 is described herein to notify the supply-demand planning server 7 of the charging schedule after the change. The information terminal 5, however, may notify the vehicle 2 or the charging facility 3A of the charging schedule after the change, and the vehicle 2 or the charging facility 3A having received the notification may notify the supply-demand planning server 7. By including the vehicle 2 and the charging facility 3A in the communication channel, confidentiality of the charging schedule after the change can be maintained even if notification is made using a simpler communication protocol than that used in a case where a public communication channel is used.

[Operation of Supply-Demand Planning Server to Change Charging Schedule]

Figure 19:
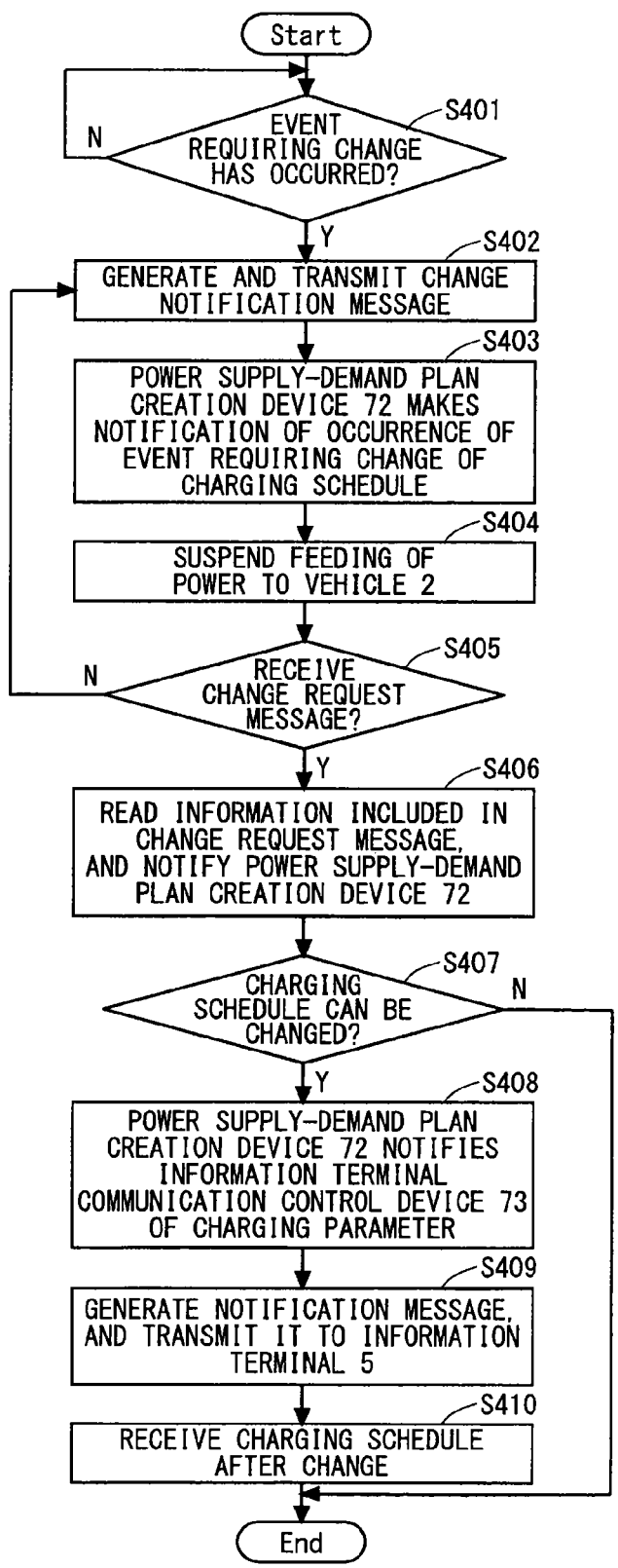
FIG. 19 is a flow chart showing operation of a supply-demand planning server according to Embodiment 4 to change a charging schedule.

Operation of the supply-demand planning server 7 is described herein with use of the flow chart of FIG. 19.

The supply-demand planning server 7 judges whether the event requiring the change of the charging schedule has occurred for each predetermined cycle or at a given timing (step S401).

For example, if (1) the charging facility communication device 70 detects input of a request for the change into the charging facility 3A, (2) the power supply communication control device 71 detects occurrence of the event requiring the change of the charging schedule in the power supply apparatus 6 or in a power network connected to the power supply apparatus 6, or (3) a component, which is not illustrated, of the supply-demand planning server 7 detects occurrence of the event requiring the change of the charging schedule, the power supply-demand plan creation device 72 is notified.

The power supply-demand plan creation device 72 notifies the information terminal communication control device 73 of the occurrence of the event requiring the change of the charging schedule. The information terminal communication control device 73 generates the change notification message including a flag (or code) indicating that the charging schedule is required to be changed, and transmits the change notification message to the information terminal 5 (step S402).

The power supply-demand plan creation device 72 also notifies the charging facility communication device 70 and the power supply communication control device 71 of the occurrence of the event requiring the change of the charging schedule (step S403). When the charging facility communication device 70 and the power supply communication control device 71 are notified of the occurrence of the event requiring the change of the charging schedule, the charging facility communication device 70 and the power supply communication control device 71 suspend feeding of power to the vehicle 2 (step S404).

After step S404, the information terminal communication control device 73 judges whether the change request message requesting the change of the charging schedule has been received for each predetermined cycle or at a given timing (step S405). If the change request message has not been received, the information terminal communication control device 73 returns to step S402. If the change request message has been received, the information terminal communication control device 73 reads information (e.g., desired charging power and desired charging completion time) included in the change request message, and notifies the power supply-demand plan creation device 72 of the read information (step S406).

The power supply-demand plan creation device 72 judges, with reference to the power feeding schedule of the charging facility 3A, whether the charging schedule can be changed in accordance with the information included in the change request message S407). If the power supply-demand plan creation device 72 judges that the charging schedule cannot be changed, the power supply-demand plan creation device 72 ends the charging change sequence.

In a case where the charging change sequence ends, the supply-demand planning server 7 preferably notifies the user that the charging schedule cannot be changed.

Although the information terminal communication control device 73 is described herein to read the information from the change request message, the power supply-demand plan creation device 72 may read the information.

If the power supply-demand plan creation device 72 judges that the charging schedule can be changed, the power supply-demand plan creation device 72 notifies the information terminal communication control device 73 of the charging parameter (e.g., the power rate per unit time, the charging start time, the estimated charging end time, and the amount of supplied power) applied in the case where the charging schedule is changed (step S408).

In this case, in a case where the charging facility 3A has surplus power, for example, the power rate is set to be lower than usual. In contrast, in a case where the charging facility 3A receives power scheduled to be supplied to another vehicle 2, the power rate is set to be higher than usual.

The information terminal communication control device 73 generates the notification message including the charging parameter, and transmits the notification message to the information terminal 5 (step S409). The notification message can include, as a request for update of the charging, schedule, information such as "Could you delay the departure time (estimated charging end time)?" and "Could you perform discharging of A watts from time B to time C?".

When the information terminal communication control device 73 receives the charging schedule after the change from the information terminal 5, the information terminal communication control device 73 notifies the power supply-demand plan creation device 72 of the charging schedule after the change (step S410), and ends processing in the charging change sequence.

Communication between the supply-demand planning server 7 and the information terminal 5 may be performed via the charging facility 3A and the vehicle 2. In this case, the power supply-demand plan creation device 72 notifies not the information terminal communication control device 73 but the charging facility communication device 70 of the charging parameter, and the charging facility communication device 70 receives the charging schedule after the change.

The charging facility communication device 70, the power supply communication control device 71, the power supply-demand plan creation device 72, and the information terminal communication control device 73 are described herein as separate devices. They, however, may be one or more programs. In the case of a plurality of programs, they are driven by the same computer or by separate computers.

[Operation of Vehicle to Change Charging Schedule]

Operation of the vehicle 2 is the same as that in Embodiment 2 (FIG. 11), and thus description thereof is omitted.

[Operation of Information Terminal to Change Charging Schedule]

Operation of the information terminal 5 is also the same as that in Embodiment 2 (FIG. 12), and thus description thereof is omitted.

The case where feeding of power to the vehicle 2 is suspended immediately if any event requiring the change of the charging schedule has occurred is described herein. Feeding of power to the vehicle 2, however, may be suspended in accordance with the details of the change request message received from the information terminal 5. Specifically, in a case where the change request message includes a flag (or code) that requests an original charging schedule, the supply-demand planning server 7 performs charging of the vehicle 2 corresponding to the information terminal 5 in accordance with the original charging schedule.

According to Embodiment 4, the following effects are produced in addition to the effects produced in Embodiment 3.

The supply-demand planning server 7 notifies the information terminal 5 of the occurrence of the event requiring the change of the charging schedule. As a result, the charging system 1A can change the charging schedule in response to the occurrence of the event requiring the change of the charging schedule in a supply-demand planning server side including the charging facility 3A, the power supply apparatus 6, and the supply-demand planning server 7.

Since the charging facility 3A includes the information input and output device 32 through which the user inputs and outputs information on the charging schedule, the charging schedule can be changed through the charging facility 3A.

Furthermore, since the supply-demand planning server 7 judges whether to suspend feeding of power to the vehicle 2 in accordance with the details of the change request message received from the information terminal 5, charging of the vehicle 2 can be completed by reserved time. This improves reliability of the charging system 1A.

The case where the request for the change is received from a user side has been described so far in Embodiments 1 and 3. The case where any event requiring the change of the charging schedule has occurred in a charging facility side has been described in Embodiments 2 and 4. Embodiments according to the present invention are not limited to the above-mentioned embodiments. Embodiments 1 to 4 may be independent of one another, and any of Embodiments 1 to 4 may be combined with each other.

The case where the user is notified that the charging schedule cannot be changed by displaying it on a screen or by using sounds has been described. A method for notifying the user is not limited to this example, and the user may be notified by another method such as blinking of a lamp, for example.

Although the charging parameter and the like are described to be transmitted by using a message, the number of messages is not limited to one, and a plurality of messages may be combined with one another to transfer a single information group.

The invention claimed is:

1. An apparatus for changing a charging schedule of a battery installed in a vehicle, the apparatus comprising:
    a communication device, installed in the vehicle, to receive a request for a change of said charging schedule;
    acquire, from a charging control apparatus in a charging facility side, a charging parameter applied in a case that said charging schedule is changed; and
    a control device, installed in the vehicle, to create a new charging schedule after the change using a new charging parameter acquired from said charging control apparatus in said charging facility side, wherein
    said communication device transmits said new charging schedule to said charging control apparatus in said charging facility side, and receives, from said charging control apparatus in said charging facility side, a response indicating whether implementation of said new charging schedule is possible.

2. The apparatus according to claim 1, wherein
    said control device suspends charging after said charging schedule is received.

3. The apparatus according to claim 1, wherein
    said communication device receives the request for the change of said charging schedule from an information input and output apparatus that communicates with said vehicle.

4. The apparatus according to claim 1, wherein
    said communication device receives, from said charging control apparatus, notification that an event requiring the change of said charging schedule has occurred instead of receiving the request for the change of said charging schedule.

5. The apparatus according to claim 1, wherein
    in a case of obtaining user's approval on whether the charging parameter acquired from said charging control apparatus is applied to change the charging schedule, a change detail information is notified to an information terminal.

6. The apparatus according to claim 1, wherein
    said charging parameter satisfies a condition before the change of the charging schedule.

7. The apparatus according to claim 1, wherein
    in a case that said charging parameter does not satisfy a condition before the change of the charging schedule, said charging parameter includes a flag for selection of whether to approve the change of the charging schedule.

8. A charging control apparatus in a charging facility side, the charging control apparatus comprising:
    a device to communicate with a vehicle in which a battery is installed; and
    a power feeding control device to control feeding of power to said battery in accordance with a charging schedule, wherein when said communication device receives a request for a change of said charging schedule, said communication device notifies said vehicle of a charging parameter applied in a case that said charging schedule is changed, said communication device transmits a response indicating whether implementation of the charging schedule is possible to said vehicle, the charging schedule being notified from said vehicle as a response to said charging parameter.

9. An information input and output apparatus for communicating with a vehicle in which a battery is installed, the information input and output apparatus when a change of a charging schedule of said battery is input, to notify said vehicle of a request for the change of the charging schedule;

to acquire information on a charging state of said battery from said vehicle;

to acquire, from a charging control apparatus in a charging facility side that feeds power to said battery, a charging parameter applied in a case that said charging schedule is changed;

to create a new charging schedule after the change using the information on the charging state of said battery as acquired and a new charging parameter; and to transmit said new charging schedule to said charging control apparatus in said charging facility side, and receive, from said charging control apparatus in said charging facility side, a response indicating whether implementation of said new charging schedule is possible, to convert information on said new charging parameter into at least one of a delay time of departure and a power rate, and output the converted information, if implementation of said new charging schedule is possible, and to output information indicating implementation of the charging schedule is not possible, if implementation of said new charging schedule is not possible.

10. The apparatus according to claim 1, wherein said control device suspends charging after the request for a change of said charging schedule is received.

* * * * *